United States Patent
Feng et al.

(10) Patent No.: US 8,434,873 B2
(45) Date of Patent: May 7, 2013

(54) INTERACTIVE PROJECTION DEVICE

(75) Inventors: Yaojun Feng, Shenzhen (CN); Weiping Tang, Shenzhen (CN); Ying Liu, Hong Kong (HK)

(73) Assignee: Hong Kong Applied Science and Technology Research Institute Company Limited, Shatin, NT (HK)

( * ) Notice: Subject to any disclaimer, the term of this patent is extended or adjusted under 35 U.S.C. 154(b) by 448 days.

(21) Appl. No.: 12/751,798

(22) Filed: Mar. 31, 2010

(65) Prior Publication Data

US 2011/0241986 A1  Oct. 6, 2011

(51) Int. Cl.
*G03B 21/14* (2006.01)

(52) U.S. Cl.
USPC ............. 353/20; 353/31; 353/38; 353/42; 353/69; 353/81; 359/489.08

(58) Field of Classification Search .......... 353/20, 353/31, 38, 42, 69, 81, 98; 359/251, 304, 359/489.08, 583, 638, 640; 348/742, 739, 348/744, E5.085, E9.012; 349/5, 7, 8, 9; 356/391, 622
See application file for complete search history.

(56) References Cited

U.S. PATENT DOCUMENTS

| | | | | |
|---|---|---|---|---|
| 5,235,363 A * | 8/1993 | Vogeley et al. | ............ | 353/122 |
| 5,239,322 A * | 8/1993 | Takanashi et al. | ............ | 353/31 |
| 6,260,973 B1 * | 7/2001 | Minato et al. | ............ | 353/42 |
| 6,280,034 B1 | 8/2001 | Brennesholtz | | |
| 6,666,896 B1 * | 12/2003 | Peng | ............ | 353/94 |
| 6,747,710 B2 * | 6/2004 | Hall et al. | ............ | 349/9 |
| 6,830,345 B2 | 12/2004 | Kamm et al. | | |
| 6,877,859 B2 * | 4/2005 | Silverstein et al. | ............ | 353/20 |
| 6,979,087 B2 | 12/2005 | Honig et al. | | |
| 7,176,881 B2 * | 2/2007 | Nishimura et al. | ............ | 345/156 |
| 7,410,260 B2 | 8/2008 | Mehrl | | |
| 7,787,188 B2 * | 8/2010 | Goto | ............ | 359/629 |
| 2004/0212783 A1 * | 10/2004 | Wada | ............ | 353/31 |
| 2006/0103810 A1 * | 5/2006 | Ma et al. | ............ | 353/20 |
| 2008/0051135 A1 | 2/2008 | Destain et al. | | |
| 2009/0028032 A1 | 1/2009 | Toishi et al. | | |
| 2009/0079969 A1 | 3/2009 | Chou et al. | | |
| 2009/0147224 A1 * | 6/2009 | Kurozuka et al. | ............ | 353/98 |
| 2010/0073578 A1 * | 3/2010 | Tan | ............ | 348/744 |
| 2011/0080534 A1 * | 4/2011 | Perng et al. | ............ | 349/9 |

FOREIGN PATENT DOCUMENTS

| | | |
|---|---|---|
| CN | 1749942 | 3/2006 |
| CN | 201307347 | 9/2009 |

* cited by examiner

*Primary Examiner* — Georgia Y Epps
*Assistant Examiner* — Sultan Chowdhury
(74) *Attorney, Agent, or Firm* — Hamre, Schumann, Mueller & Larson, P.C.

(57) ABSTRACT

An interactive projection device includes a light source configured to emit an input light beam, wherein the light source comprises a visible light emitting device; a first beam splitter configured to split the input light beam into first and second split light beams; a second beam splitter configured to split a scattered light beam received from a surface into third and fourth split light beams; an image forming device configured to produce an image light beam based on the first split light beam and emit the image light beam onto the surface through the first and second splitters, thereby generating a projection image on the surface; and a detector configured to detect the invisible light of the third split light beam, thereby acquiring a scattering image from the surface.

31 Claims, 19 Drawing Sheets

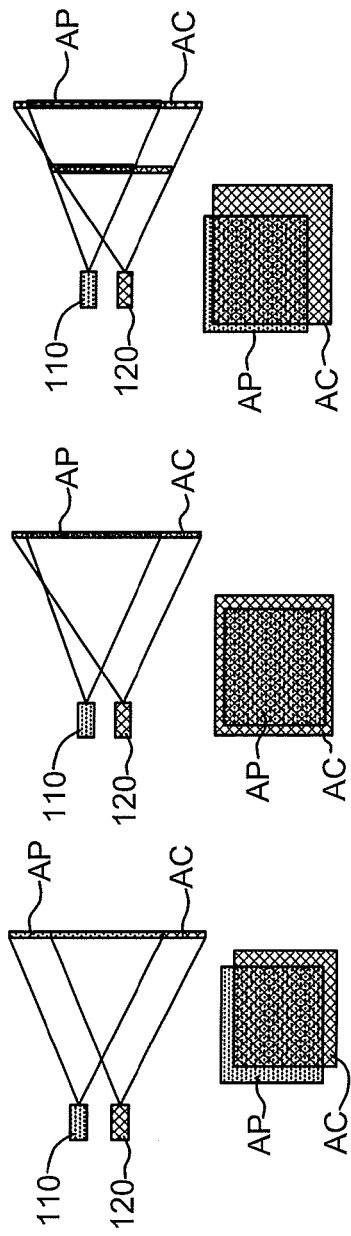

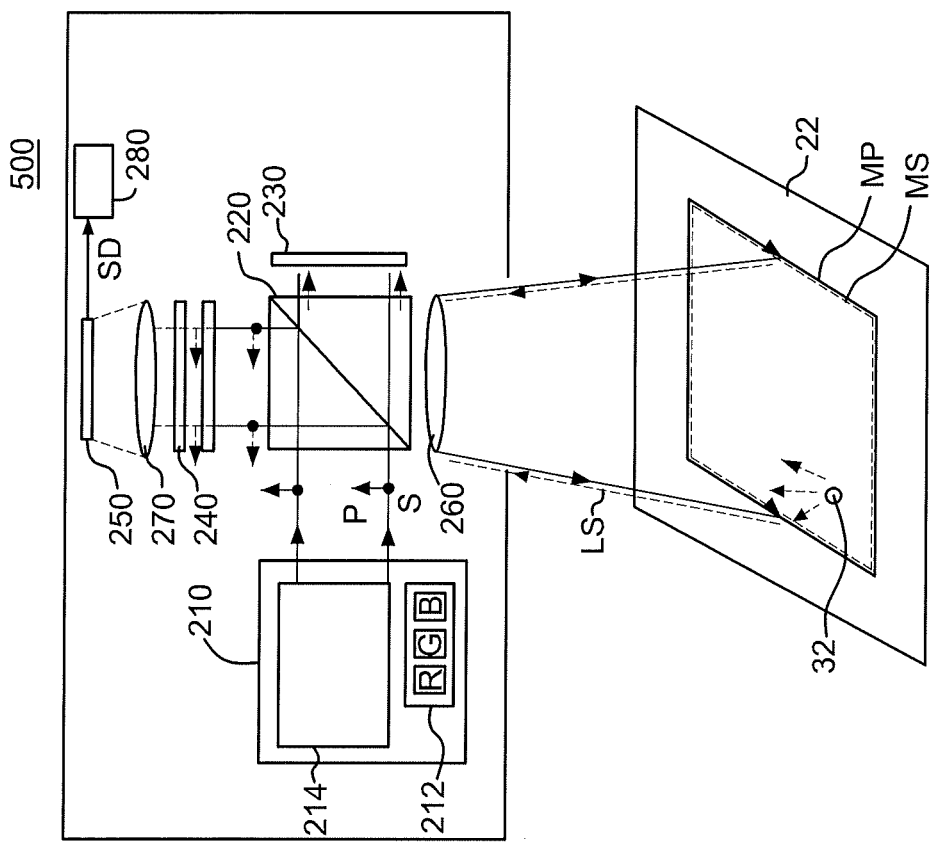

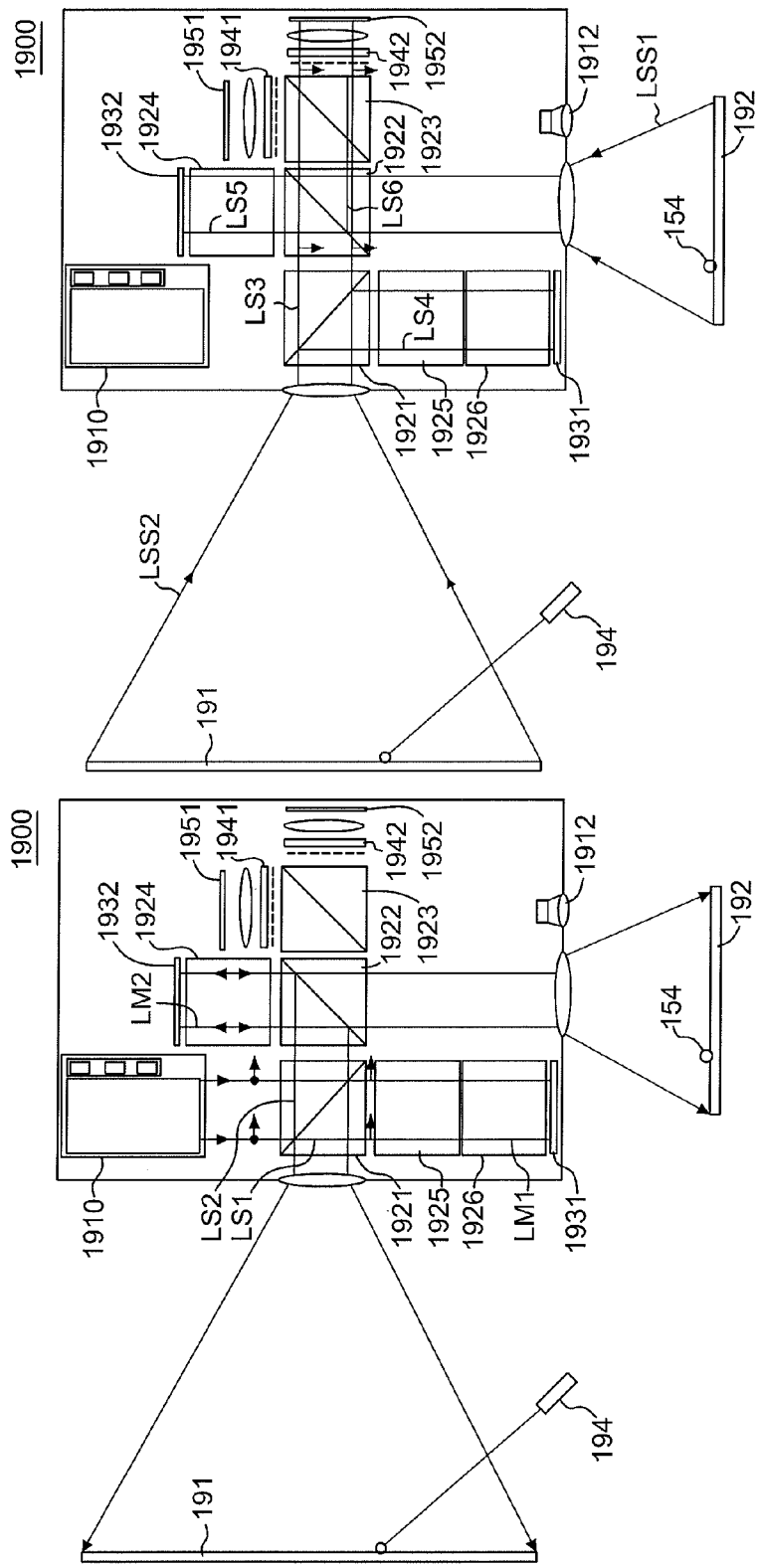

INTERACTIVE PROJECTION DEVICE

FIELD OF THE INVENTION

The invention relates generally to an interactive projection device, and, more particularly, to an interactive projection device capable of projecting and capturing images without producing displacement between the projected and captured images.

BACKGROUND OF THE INVENTION

Recently, interactive projection devices have been developed to allow human users to use a projection surface both for viewing content, such as computer graphics, video, and the like, as well as for inputting information into the system. Meetings and presentations are often carried out using such interactive projection devices. By using a white board as a screen for projection, comments and underline can be directly written down on the white board, and immediately created on the whiteboard so as to organize a discussion.

An interactive projection device typically includes a projector for projecting images on a screen, and a camera for capturing images from the screen. However, because of independent operations of the projector and the camera, position detection errors inevitably occur in respect to changes of the relative position between the projector and the camera, necessitating additional calibration and refocus processes for the camera.

FIGS. 1A-1C are diagrams illustrating position detection errors in a conventional projection device. In FIG. 1A, displacement between a projector 110 and a camera 120 leads to displacement between a projected area 'AP' of the projector 110 and a captured area 'AC' of the camera 120. Accordingly, an additional calibration is performed on the camera so as to expand the captured area 'AC' to cover the projected area 'AP', as shown in FIG. 1B. However, once the projector 110 is refocused and the relative position between the projector and the camera changes, displacement between the projected area 'AP' and the captured area 'AC' will appear again as shown in FIG. 1C, and therefore requires re-calibration and refocus processes for the camera 120.

U.S. Pat. No. 6,979,087 to Honig, et al. titled "Display System with Interpretable Pattern Detection" describes a display system with interpretable pattern detection. However, the display system employs a projector and an image sensor that are separated by different optical axes. As described above, calibration is required to eliminate the displacement between projected and captured images, and the image sensor has to be refocused when the projector is refocused.

In another aspect, China Patent Publication No. 201307347 to Hong-Xian Hao titled "Interactive Computer Projection Teaching Management Device and System" discloses an indicating end to substitute a laser pointer commonly used in conventional projection devices so as to provide advantages of interactive computer teaching. Additionally, U.S. Pat. No. 7,410,260 to Mehrl titled "Use of a CCD Camera in a Projector Platform for Smart Screen Capability and Other Enhancements" discloses an optical projection and capture system and focuses mainly on recognition of an interaction signal. However, these techniques both require an external input device to point to a screen and thus have limited applications.

In another aspect, China Patent No. 1,749,942 to Meng Fanhua, et al. titled "Optical Device for Interactive Projection Display" proposes an optical device for interactive projection display with a beam splitting mirror in the projection optical axis to make the photoelectronic detector and the projection lens of the optical device coaxial. Additionally, U.S. Patent Publication No. 20080051135 to Destain; Patrick R.; et al. titled "Combination Camera/Projector System" discloses a combination camera/projection system including a single polarizing beam splitter (PBS). Additionally, U.S. Pat. No. 6,830,345 to Kamm, et al. titled "Imaging Device" discloses an imaging device including a common polarization selective beam splitter device. However, these techniques may have a low signal to noise (S/N) ratio due to the imperfect splitting performance of the single beam splitting mirror, beam splitter, or beam splitter device.

On the contrary, U.S. patent application Ser. No. 09/365,210 to Brennesholtz entitled "Efficient Two-Panel Projection System employing Complementary Illumination" describes an imaging system having four PBSs. Additionally, U.S. Patent Publication No. 20090079969 to Chou; Sen-Yih; et al. titled "Method and apparatus for scatterfield microscopical measurement" discloses an apparatus for scatterfield microscopical measurement utilizing two PBSs. Additionally, U.S. Patent Publication No. 20090028032 to Toishi; Mitsuru; et al. titled "Hologram Reproducing Apparatus" discloses a hologram reproducing apparatus with four PBSs. However, the above conventional techniques are all applied to different technical fields from that of the subject invention and only incorporated herein for reference.

SUMMARY OF THE INVENTION

In view of the above, an interactive projection device is provided capable of accurately projecting and capturing images without producing any displacement between the projected and captured images. Moreover, the interactive projection device can also be realized without any external pointer. Furthermore, the interactive projection device can also be implemented with multiple beam splitters, thus having a high signal to noise ratio.

In one aspect, an interactive projection device is provided, comprising: a light source configured to emit an input light beam, wherein the light source comprises a visible light emitting device; a beam splitter configured to split the input light beam into first and second split light beams, and split a scattered light beam received from a surface into third and fourth split light beams; an image forming device configured to produce an image light beam based on the first split light beam and emit the image light beam onto the surface through the beam splitter, thereby generating a projection image on the surface; a filter configured to filter out visible light of the third split light beam; and a detector configured to detect the invisible light of the third split light beam from the filter, thereby acquiring a scattering image from the surface.

In another aspect, an interactive projection device is provided, comprising: a light source configured to emit an input light beam, wherein the light source comprises a visible light emitting device; a first beam splitter configured to split the input light beam into first and second split light beams; a second beam splitter configured to split a scattered light beam received from a surface into third and fourth split light beams; an image forming device configured to produce an image light beam based on the first split light beam and emit the image light beam onto the surface through the first and second splitters, thereby generating a projection image on the surface; and a detector configured to detect the invisible light of the third split light beam, thereby acquiring a scattering image from the surface.

In further another aspect, an interactive projection device is provided, comprising: a light source configured to emit an input light beam, wherein the light source comprises a visible light emitting device; a first beam splitter configured to split the input light beam into first and second split light beams; a first image forming device configured to produce a first image light beam based on the first split light beam and emit the first image light beam onto a first surface, thereby generating a first projection image on the first surface; a second beam splitter configured to split a first scattered light beam received from a second surface into third and fourth split light beams; a second image forming device configured to produce a second image light beam based on the second split light beam and emit the second image light beam onto the second surface, thereby generating a second projection image on the second surface; and a detector configured to detect the invisible light of the third split light beam, thereby acquiring a scattering image from the second surface.

In yet further another aspect, an interactive projection device is provided, comprising: a light source configured to emit an input light beam, wherein the light source comprises a visible light emitting device; a first beam splitter configured to split the input light beam into first and second split light beams and split a first scattered light beam received from a first surface into third and fourth split light beams; a first image forming device configured to produce a first image light beam based on the first split light beam and emit the first image light beam onto the first surface, thereby generating a first projection image on the first surface; a second beam splitter configured to split a second scattered light beam received from a second surface into fifth and sixth split light beams; a second image forming device configured to produce a second image light beam based on the second split light beam and emit the second image light beam onto the second surface, thereby generating a second projection image on the second surface; a first detector configured to detect the invisible light of the fifth split light beam, thereby acquiring a first scattering image from the second surface; and a second detector configured to detect the invisible light of the third split light beam, thereby acquiring a second scattering image from the first surface.

These and other features, aspects, and embodiments are described below in the section entitled "Detailed Description of the Invention."

BRIEF DESCRIPTION OF THE DRAWINGS

Features, aspects, and embodiments are described in conjunction with the attached drawings, in which:

FIGS. 1A-1C are diagrams illustrating position detection errors in a conventional interactive projection device;

FIGS. 2A-5 are schematic diagrams of interactive projection devices having one image forming device, one detector, and one beam splitter in accordance with different embodiments;

FIGS. 19-23 are schematic diagrams of interactive projection devices having two image forming devices, two detectors, and multiple polarizing beam splitters in accordance with different embodiments.

DETAILED DESCRIPTION OF THE INVENTION

Figure 2B:
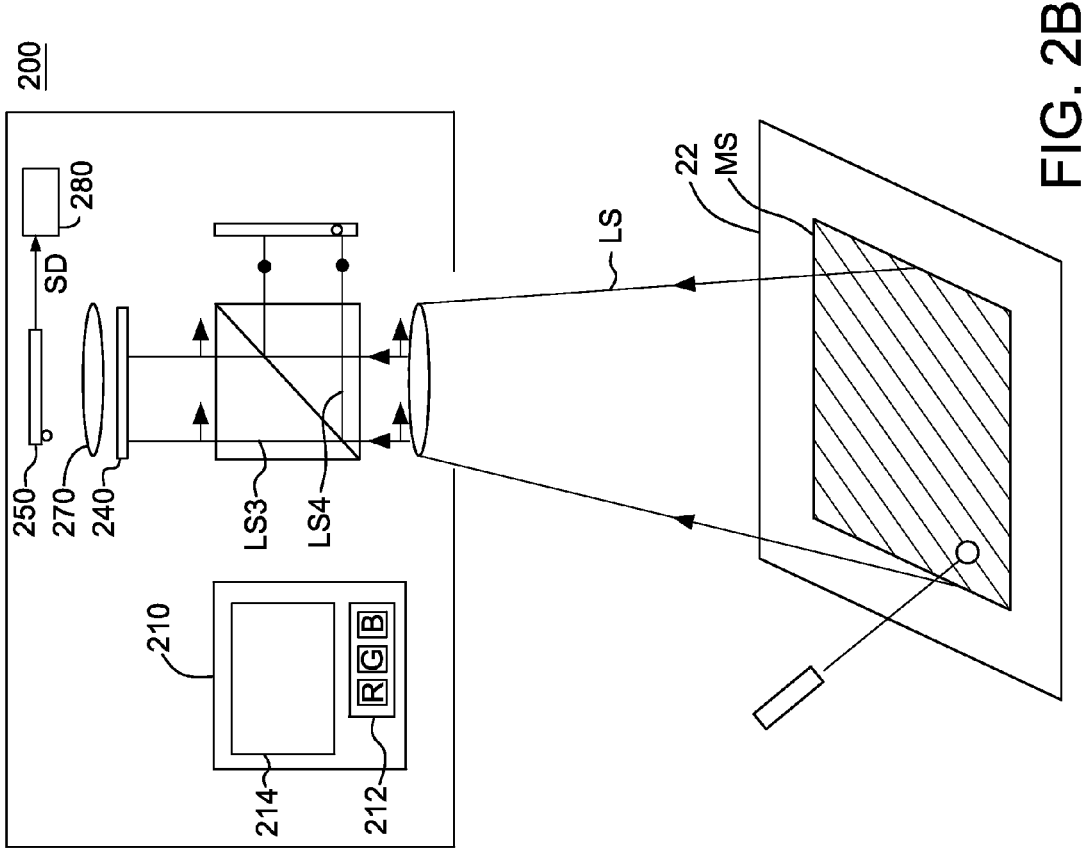
Figure 2A:
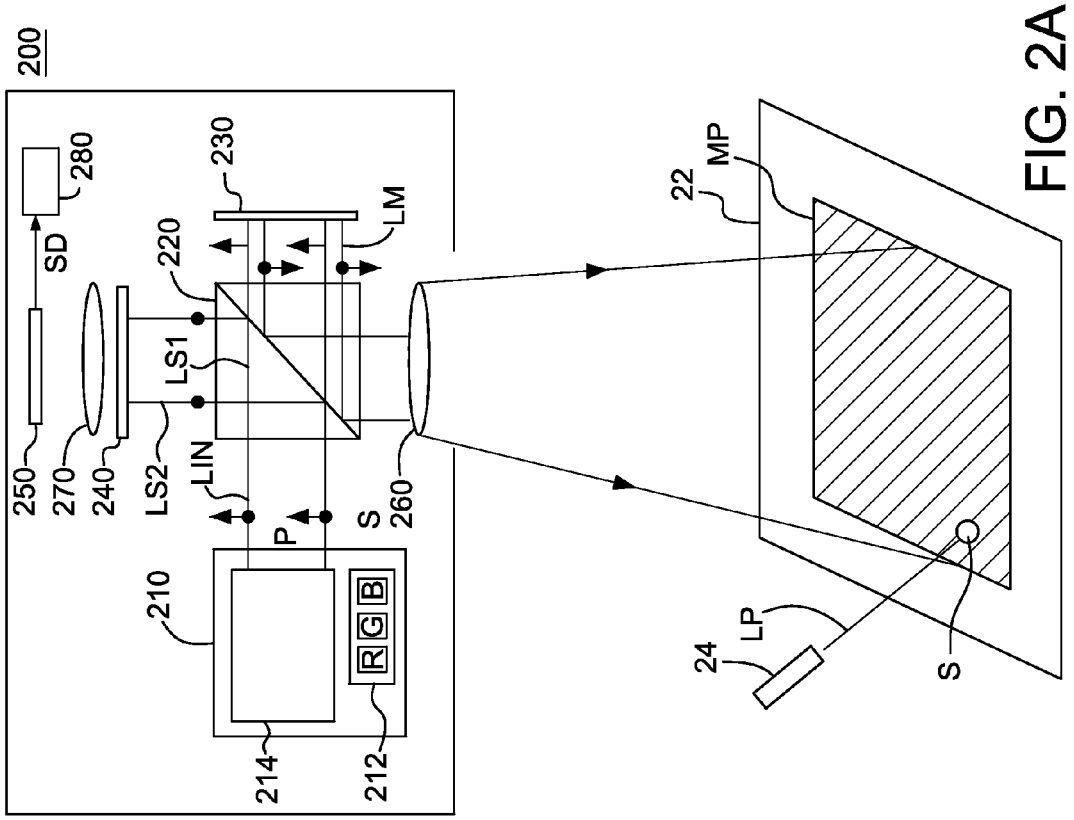

FIGS. 2A and 2B are schematic diagrams of an interactive projection device 200 in accordance with an embodiment. The interactive projection device 200 can be configured to simultaneously project a projection image (e.g., dynamic video or still picture) 'MP' on a surface 22 (e.g., a screen) as shown in FIG. 2A and capture a scattering image (e.g. dynamic video or still picture) 'MS' from the surface 22 as shown in FIG. 2B. The interactive projection device 200, by taking advantage of reversibility of light, is capable of accurately projecting the projection image 'MP' and capturing the scattering image 'MS' without producing any displacement between the two images 'MP' and 'MS', as is detailed in the following descriptions.

In the embodiment, the interactive projection device 200 can cooperate with a pointer 24 such as a laser pointer, thereby detecting a target spot 'S' pointed by the pointer 24 on the surface 22 simultaneously when projecting the projection image 'MP' onto the surface 22. Preferably, the pointer 24 can be configured to generate either invisible light (e.g., infrared light or ultraviolet light) or visible light that serves as a pointing light beam 'LP' under user control. In details, the pointer 24 can be controlled by an user to emit visible light when the user does not determine the position of target spot 'S' on the surface 22, and to emit invisible light when the user determines the position of the target spot 'S' on the surface 22. The pointing light beam 'LP' that is controlled to be visible or invisible light, after emitted to the surface 22, can be further scattered from the surface 22 back into the interactive projection device 200, in which the visible light can be blocked while the invisible light can be passed and captured. Accordingly, the interactive projection device 200 can recognize the position of target spot 'S' indicated by the invisible light, as is detailed in the following descriptions.

Referring first to FIG. 2A, the interactive projection device 200 includes a light source 210, a polarizing beam splitter 220, an image forming device 230, a filter 240, and a detector 250. The light source 210, oriented to one side of the polarizing beam splitter 220, can be configured to emit an input light beam 'LIN' in the direction of the polarizing beam splitter 220. Preferably, the light source 210 includes a visible light emitting device 212 configured to emit red color light, green color light, and blue color light, and a light combiner 214 configured to receive and combine the red, green, and blue color lights into the input light beam 'LIN'.

As shown, the polarizing beam splitter 220 can be arranged between the light source 210 and the image forming device 230, and between the filter 240 and the surface 22. With such an arrangement, the polarizing beam splitter 220 can be configured to receive the input light beam 'LIN' from the light source 210, split the input light beam 'LIN' into first and second split light beams 'LS1' and 'LS2', and direct one of the first and second split light beams 'LS1' and 'LS2' (e.g., the first split light beam 'LS1' as shown) to the image forming device 230, as shown in FIG. 2A.

In a preferred embodiment also shown in FIGS. 2A and 2B, the polarizing beam splitter 220 is a polarizing beam splitter (PBS) which can transmit a first polarization component of light incident onto it while reflecting a second polarization component of the light. As such, the polarizing beam splitter 220 can transmit the first polarization component of the input light beam 'LIN' as the first split light beam 'LS1' to the image forming device 230 while reflecting the second polarization component of the input light beam 'LIN' as the second split light beam 'LS2' to the filter 240. The polarizing beam splitter can be replaced with other common beam splitters (e.g., a partial mirror) in alternative embodiments.

The filter 240, such as a visible light filter, can filter out visible light of the second split light beam 'LS2', thus preventing the second split light beam 'LS2' from being transmitted to the detector 250 located behind the filter 240.

The image forming device 230, after receiving the first split light beam 'LS1', can produce an image light beam 'LM' based on the received first split light beam 'LS1'. The image light beam 'LM', which includes first and second polarization components, can then be emitted from the image forming device 230 to the polarizing beam splitter 220, which can then transmit the first polarization component in the direction of the light source 210 and reflect the second polarization component in the direction of the surface 22. As a result, the projection image 'MP' represented by the second polarization component of the image light beam 'LM' can be generated on the surface 22. Preferably, the image forming device 230 can be a reflective forming device, and more preferably, a liquid crystal on silicon (LCOS) device, or alternatively, a reflective liquid crystal display (LCD) device.

Preferably, the interactive projection device 200 can further include a first lens device 260 disposed between the polarizing beam splitter 220 and the surface 22, configured to guide the image light beam 'LM' from the polarizing beam splitter 220 to the surface 22, thereby increasing the uniformity of light distribution on the surface 22 and enhance the quality of the projection image 'MP'.

Turning to refer to FIG. 2B, the image light beam 'LM' and the pointing light beam 'LP' reaching surface 22 can be further scattered back to the polarizing beam splitter 220 in the interactive projection device 200, collectively forming a scattered light beam 'LS'.

The polarizing beam splitter 220 arranged between the filter 240 and the surface 22 can be configured to split the scattered light beam 'LS' into third and fourth split light beams 'LS3' and 'LS4', and direct one of the third and fourth split light beams 'LS3' and 'LS4' (e.g., the third split light beam 'LS3' as shown) to the filter 240, as shown in FIG. 2B.

In the preferred embodiment where the polarizing beam splitter 220 is a PBS, the polarizing beam splitter 20 can transmit the first polarization component (e.g., "p" polarization or "s" polarization) of the scattered light beam 'LS' as the third split light beam 'LS3' to the filter 240 while reflecting the second polarization component (e.g., "s" polarization or "p" polarization) of scattered light beam 'LS' as the fourth split light beam 'LS4' to the image forming device 230.

Preferably, the interactive projection device 200 can further include a second lens device 270 disposed between the polarizing beam splitter 220 and the detector 250 (e.g., between the polarizing beam splitter 220 and the filter 240, or between the filter 240 and the detector 250), configured to guide the third split light beam 'LS3' to the detector 250.

The filter 240, after receiving the third split light beam 'LS3' from the polarizing beam splitter 220, can filter out visible light of the third split light beam 'LS3', namely, the visible light of the first component of the scattered light beam 'LS'. Since the scattered light beam 'LS' includes the image light beam 'LM' (visible) and the pointing light beam 'LP' (visible or invisible) scattered from the surface 22, only the first component of the invisible light of the pointing light beam 'LP' scattered from the surface 22 can pass through the filter 240 and reach the detector 250 when the pointer 24 is controlled to emit invisible light to the target spot 'S'.

The detector 250 can be configured to detect the invisible light of the third split light beam 'LS3' passing through the filter 240. In other words, the detector 250 can detect the first component of the invisible light of the pointing light beam 'LP' scattered from the surface 22. As a result, the detector 250 can capture the scattering image 'MS' from the surface 22, and recognize the position of the target spot 'S' on the surface 22.

Depending on design requirements, the interactive projection device 200 can further include a processor 280 configured to generate a reaction control signal in accordance with a detection signal 'SD' generated by the detector 250.

One unique feature of the interactive projection device 200 lies in that it utilizes reversibility of light, which ensures that any point (e.g., the target spot 'S') in the projection image 'MP' generated on the surface 22 has a corresponding point in the scattering image 'MS' detected by the detector 250. In other words, the interactive projection device 200 can generate the projection image 'MP' and capture the scattering image 'MS' on the same area of the surface 22. Accordingly, the interactive projection device 200 is capable of accurately projecting the projection image 'MP' and capturing the scattering image 'MS' without producing any displacement between the two images 'MP' and 'MS'. Consequently, compared to conventional technologies that require additional calibration and refocus processes, the interactive projection device 200 can have simpler operation while providing higher detection accuracy.

Additionally, although the interactive projection device 200 in the embodiment of FIGS. 2A and 2B employs the pointing light beam 'LP' as a light source to form the scattering image 'MS', various other light sources can be utilized to generate scattering images.

Figure 3:
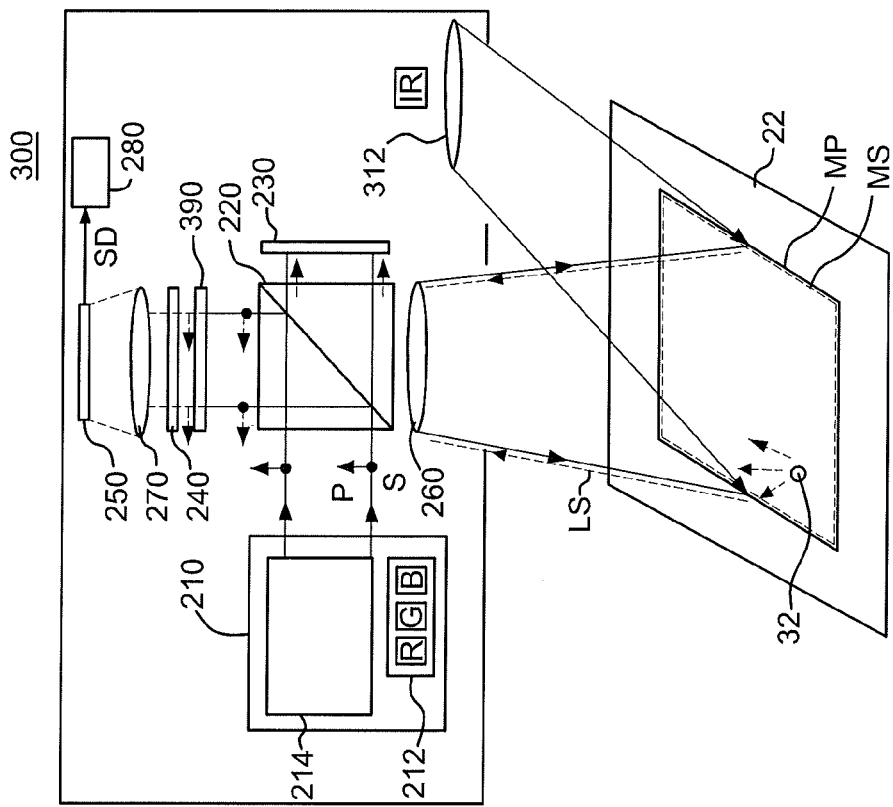

FIG. 3 is a schematic diagram of an interactive projection device 300 in accordance with another embodiment. The interactive projection device 300 differs from the interactive projection device 200 of FIGS. 2A and 2B only in replacement of the pointer 24 with an invisible light emitting device 312 and an object 32 (e.g., a finger) movable on the surface 22. The invisible light emitting device 312, such as an infrared light emitting device or an ultraviolet light emitting device, can be configured to emit invisible light to the surface 22. Accordingly, the invisible light reflected by the surface 22 and the object 32 can form the scattered light beam 'LS' which can finally pass through the polarizing beam splitter 220, the filter 240, and reach the detector 250. Based on different reflection characteristics between the object 32 and the surface 22, the detector 250 is able to recognize the position of the object 32.

Optionally, a polarizer 390 can be further arranged between the polarizing beam splitter 220 and the detector 250, configured to transmit a first polarization of light incident to it and block a second polarization of the light incident to it. In cases where the filter 240 does not completely filter the light beam LS2 split by the polarizing beam splitter 220 from the input light beam 'LIN', the polarizer 390 ensures that very small amount of the first split light beam 'LS1' reaches the detector 250, so that the background of signal is reduced and the signal from the scattered light beam 'LS' can dominate the signal detected by the detector 250. Other details about the structure and the operation of the interactive projection device 300 are similar to those described for the interactive projection device 200 of FIGS. 2A and 2B so are omitted for brevity.

Figure 4:
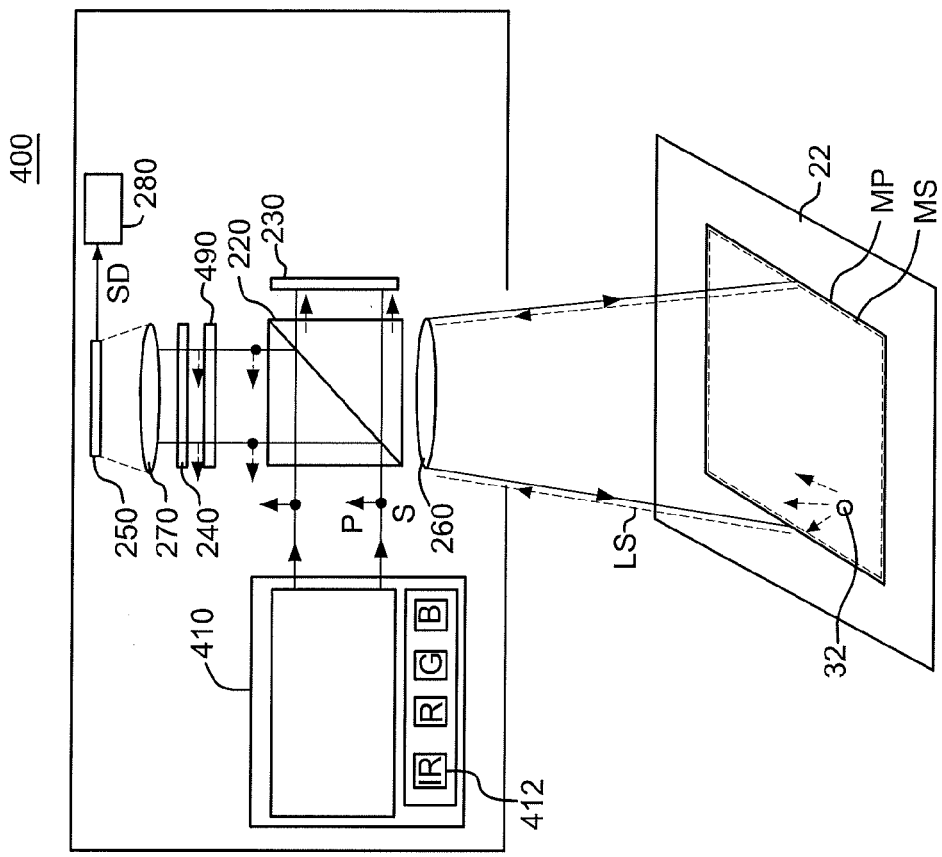

FIG. 4 is a schematic diagram of an interactive projection device 400 in accordance with another embodiment. The interactive projection device 400 differs from the interactive projection device 300 of FIG. 3 only in the different location of the invisible light emitting device and the necessity of the polarizer. As shown, an invisible light emitting device 412 is combined into a light source 410, which can therefore emit an input light beam 'LIN' consisting of visible and invisible light into the polarizing beam splitter 220. The invisible light of the input light beam 'LIN', after being split by the polarizing beam splitter 220, transmitted to the image forming device 230, and reflected to and further split by the polarizing beam splitter 220, can finally reach the surface 22.

Additionally, a polarizer 490 is preferably disposed between the polarizing beam splitter 220 and the detector 250 to prevent the second split light beam 'LS2' from reaching the detector 250 and interfering with the capturing process of the detector 250. It is noted that although the invisible light emitting device 412 in the embodiment is illustrated as combined into the light source 410, it can be separated from the light source 410 in other embodiments. Other details about the structure and the operation of the interactive projection device 400 are similar to those described for the interactive projection device 200 of FIGS. 2A and 2B so are omitted for brevity.

FIG. 5 is a schematic diagram of an interactive projection device 500 in accordance with another embodiment. FIG. 5 differs from FIGS. 3 and 4 mainly in lack of the invisible emitting device. The interactive projection device 500 can operate in circumstances where the ambient environment provides sufficient invisible light. Similarly, the ambient light can be scattered by the object 32, transmitted through the polarizing beam splitter 220, and detected by the detector 250, allowing the detector 250 to recognize the position of the object 32. Details about the structure and the operation of the interactive projection device 500 are similar to those described for the interactive projection device 200 of FIGS. 2A and 2B so are omitted for brevity.

In accordance with an alternative embodiment with the same configuration as shown in FIG. 5, the detector 250 can recognize the position of the target spot 'S' and generate a detection signal after it recognizes a signal representing the invisible light of the third split light beam received from the filter 240. The interactive projection device can therefore operate no matter whether the ambient environment can provide sufficient invisible light or not. It should be also understood that in the configuration shown in FIG. 5, the filter 240 is not a must when the performance of polarizing beam splitter 220 is good enough. Additionally, the detector 250 can also detect the visible light instead of invisible light, or both of visible light and invisible light for the purpose of generating a reaction signal. In a case where visible light is detected by the detector 250, the captured signal is compared to a signal representing the projection image received from the image forming device 230. In an alternative embodiment, the light source 210 can be turned off when the capturing process is proceeding.

Figure 6B:
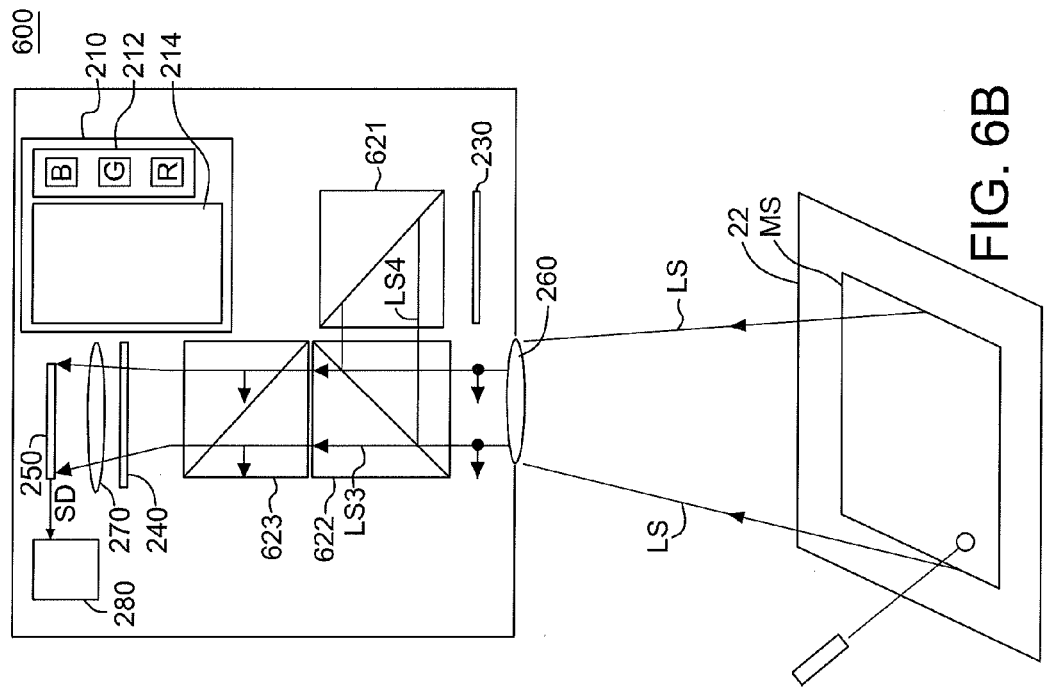
FIGS. 6-14 are schematic diagrams of interactive projection devices having one image forming device, one detector, and multiple polarizing beam splitters in accordance with different embodiments.
Figure 6A:
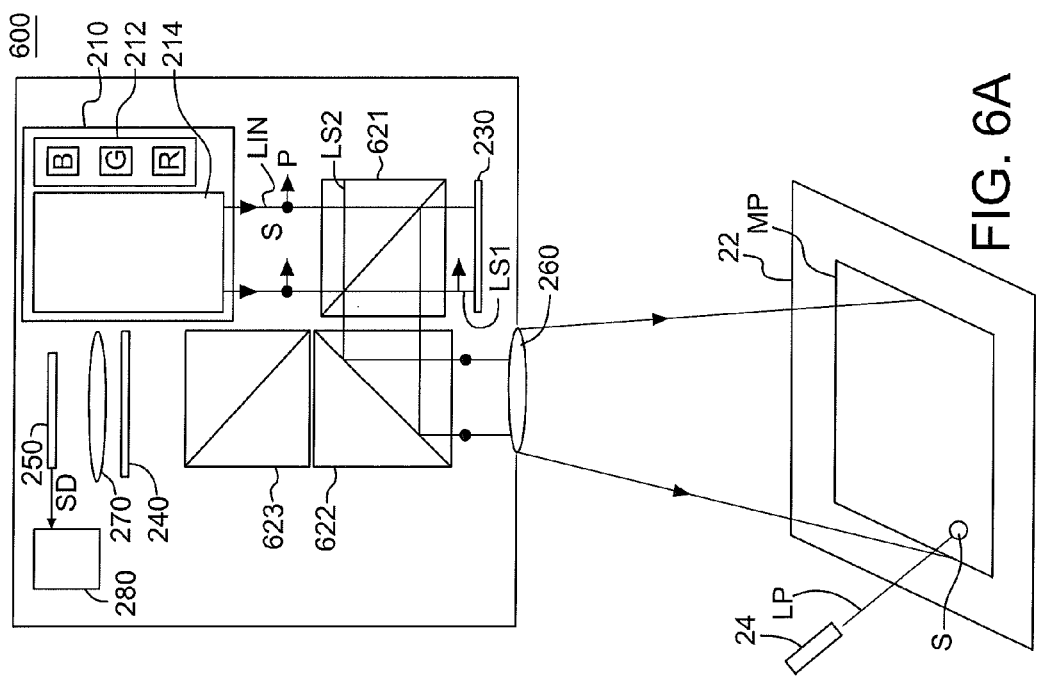

FIGS. 6A and 6B are schematic diagrams of an interactive projection device 600 in accordance with another embodiment. The interactive projection device 600 differs from the interactive projection device 200 of FIGS. 2A and 2B mainly in replacement of the single polarizing beam splitter 220 with first, second, and third polarizing beam splitters 621, 622, and 623. This difference results in that the first polarizing beam splitter plays a role of splitting the input light beam 'LIN' into the first and second split light beams 'LS1' and 'LS2' as shown in FIGS. 6A and 6B, the second polarizing beam splitter 622 contributes to splitting the scattering light beam 'LS' into the third and fourth split light beams 'LS3' and 'LS4' as shown in FIGS. 6A and 6B, and the third splitter 623 serves as an optical path for transmitting the third split light beam 'LS3' from the second polarizing beam splitter 622 to the filter 240. In another embodiment, the third polarizing beam splitter 623 can be further omitted, although the performance of the interactive projection device 600 is not excellent but is acceptable.

Compared with the interactive projection device 200 having only one polarizing beam splitter 220, the interactive projection device 600 with more polarizing beam splitters can provide a higher signal to noise S/N ratio. In the interactive projection device 200, a lower S/N ratio may result from the imperfect splitting performance of the single polarizing beam splitter 220 that causes low light rate to reach the detector 250. In contrast, the interactive projection device 600 having more polarizing beam splitters can have improved splitting performance, which prevents the split light beam 'LS2' from reaching the detector 250 and hence results in a lower background. Accordingly, in the interactive projection device 600 can have a higher S/N ratio. Other details about the structure and the operation of the interactive projection device 600 are similar to those described for the interactive projection device 200 of FIGS. 2A and 2B so are omitted for brevity.

As the interactive projection device 200 in the embodiment of FIGS. 2A and 2B can be varied to the interactive projection devices 300, 400, and 500 in the embodiments of FIGS. 3, 4, and 5 that are provided different light sources for generating the scattering image 'MS', the interactive projection device 600 of FIGS. 6A and 6B can also be modified to have different light sources for generating the scattering image.

Figure 7:
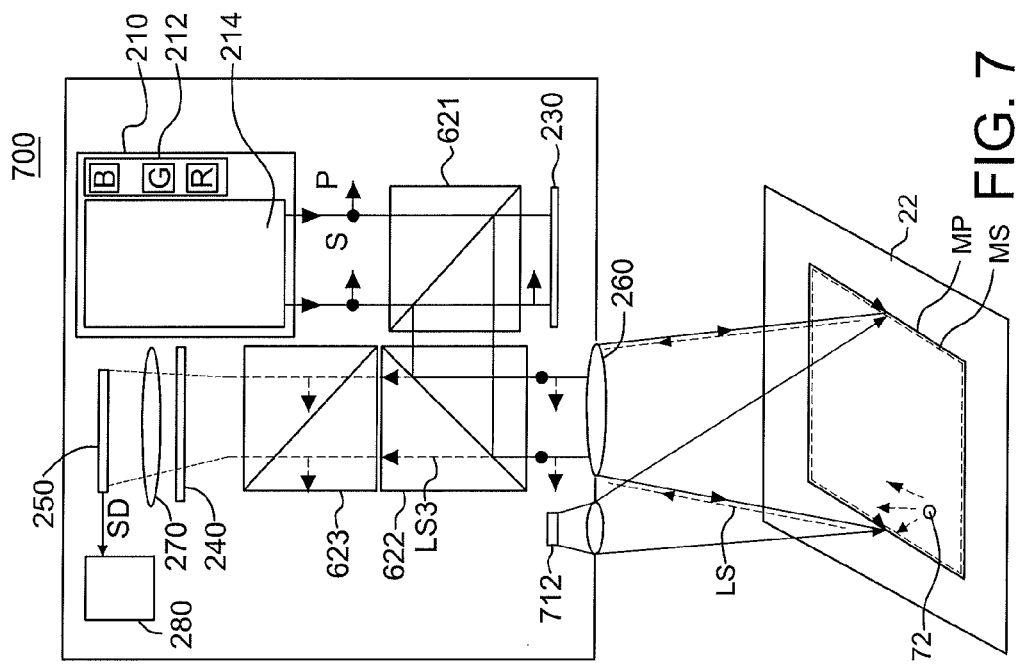
Figure 9:
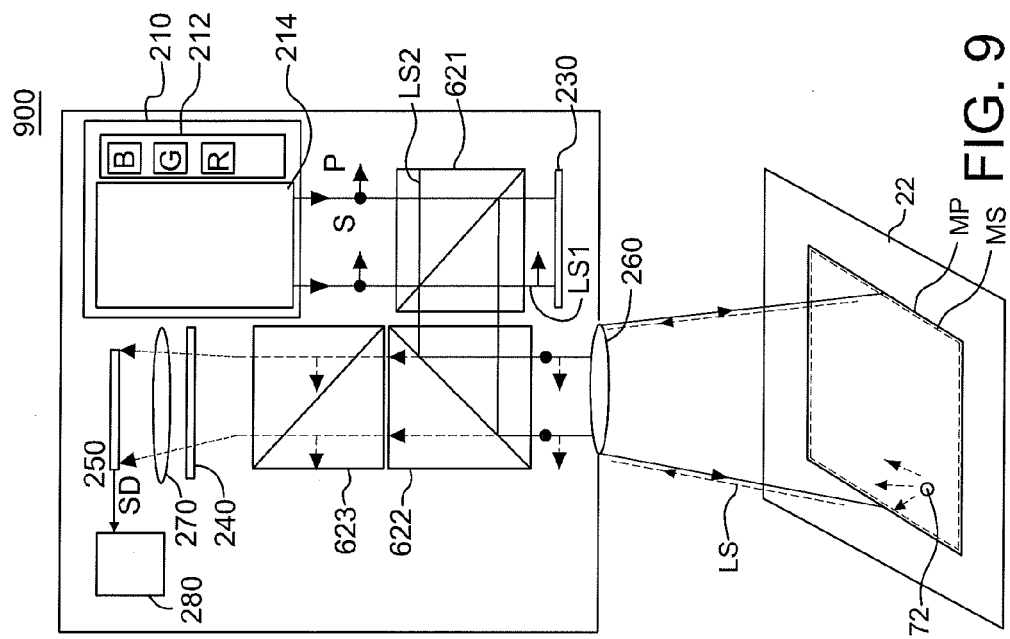
Figure 8:
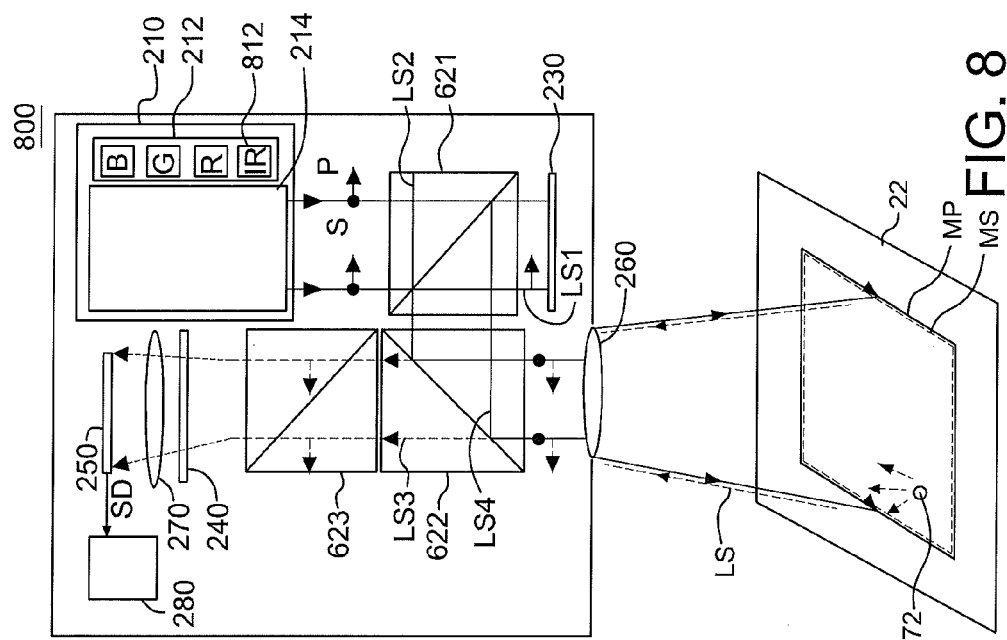

FIGS. 7-9 are schematic diagrams of interactive projection devices 700, 800, 900 in accordance with such embodiments varied from the interactive projection device 600. In the embodiments illustrated in FIGS. 7, 8, and 9, an invisible light emitting device 712 oriented to the surface 22, an invisible light emitting device 812 oriented to the first polarizing beam splitter 621, and ambient light are utilized along with an object 32 to replace the role of the pointer 24 in FIGS. 6A and 6B, respectively. Other details about the structure and the operation of the interactive projection devices 700, 800, and 900 are similar to those described for the interactive projection device 200 of FIGS. 2A and 2B so are omitted for brevity.

Figure 10:
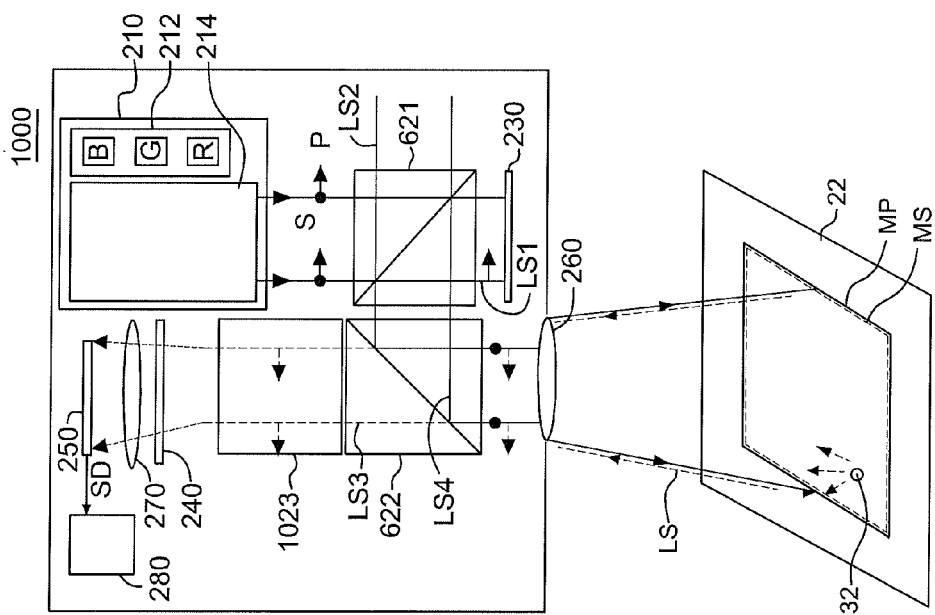

FIG. 10 is a schematic diagram of an interactive projection device 1000 in accordance with another embodiment. The interactive projection devices 600 and 1000 differ in that they use different optical elements for transmitting the third split light beam 'LS3' from the second polarizing beam splitter 622 to the filter 240. In the interactive projection device 1000, a cube 1023 such as a glass cube is used to replace the third polarizing beam splitter 623 of FIGS. 6A and 6B, because the third polarizing beam splitter 623 only serves an optical path without performing any splitting. The cube 1023 preferably has a refractive index the same as that the first polarizing beam splitter 621 at a wavelength range detected by the detector 250 to compensate the optical path difference.

As the interactive projection device 200 in the embodiment of FIGS. 2A and 2B can be varied to the interactive projection devices 300, 400, and 500 having different light sources for capturing scattering images, the interactive projection device 1000 of FIG. 10 can also be modified to have different light sources for forming scattering images.

Figure 11:
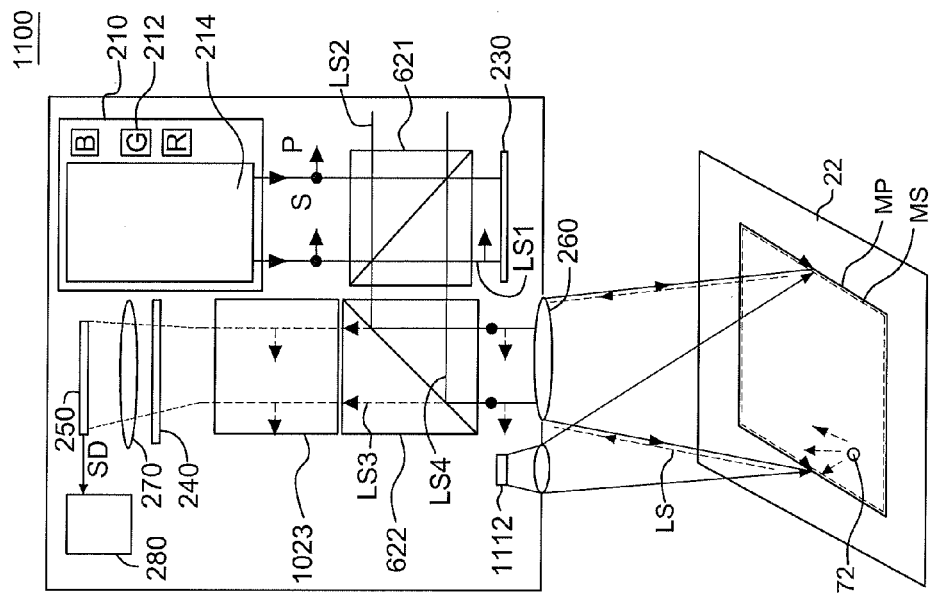
Figure 13:
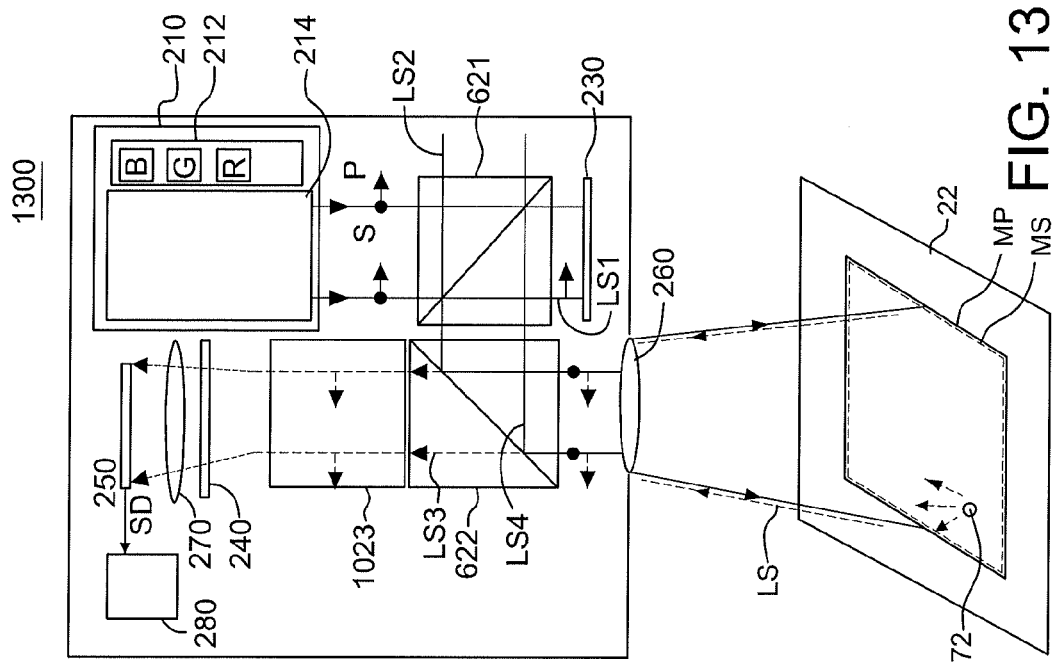
Figure 12:
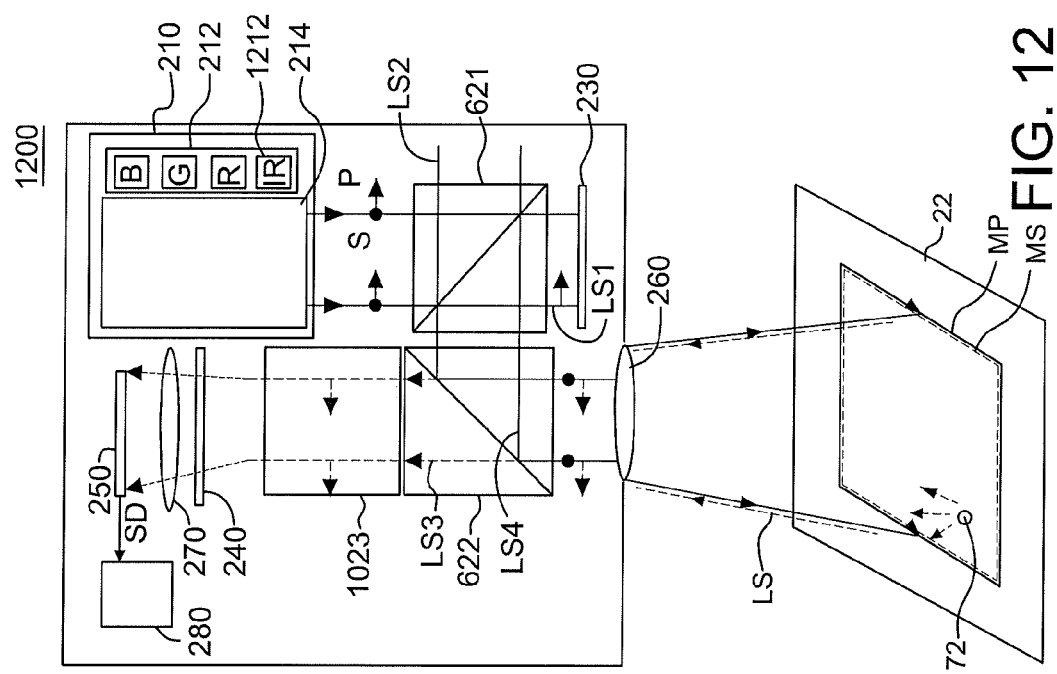

FIGS. 11-13 are schematic diagrams of interactive projection devices 1100, 1200, 1300 in accordance with such embodiments varied from the interactive projection device 1000. In the embodiments illustrated in FIGS. 11, 12, and 13, an invisible light emitting device 1112 oriented to the surface 22, an invisible light emitting device 1212 oriented to the first polarizing beam splitter 621, and ambient light are utilized along with the object 72 to replace the role of the pointer 24 in FIG. 10, respectively. Additionally, the interactive projection device 1300 can be further modified in an alternative embodiment such that the detector 250 generates a detection signal after it recognizes a signal representing the invisible light of the third split light beam received from the filter 240 and a signal representing the projection image. It should be also understood that in the configuration shown in FIG. 13, the filter 240 is not a must. Additionally, the detector 250 can also detect the visible light instead of invisible light, or both of visible light and invisible light for the purpose of generating a reaction signal. In a case where visible light is detected by the detector 250, the captured signal is compared to a signal representing the projection image received from the image forming device 230. In an alternative embodiment, the light source 210 can be turned off when the capturing process is proceeding. Other details about the structure and the operation of the interactive projection devices 1100, 1200, and 1300 are similar to those described for the interactive projection device 200 of FIGS. 2A and 2B so are omitted for brevity.

Figure 14:
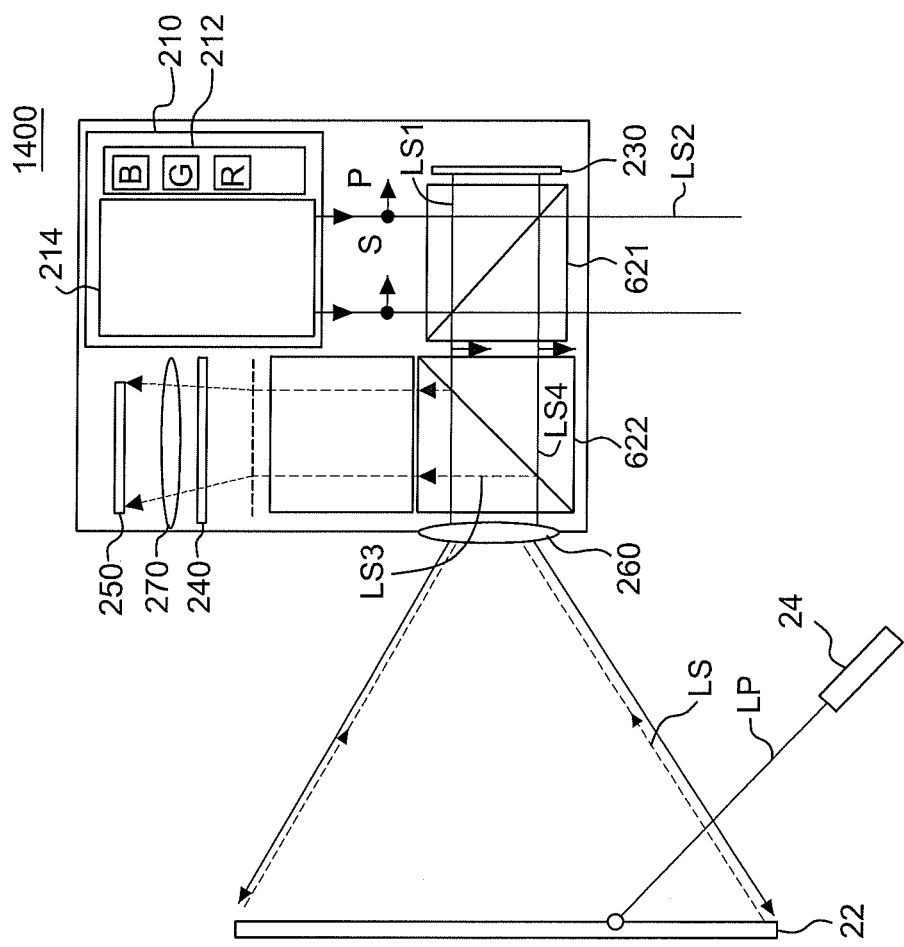

FIG. 14 is a schematic diagram of an interactive projection device 1400 in accordance with another embodiment. FIG. 14 differs from FIG. 10 mainly in the locations of the image forming device 230 and the surface 22. With such difference, the second polarization rather than the first polarization of the input light beam 'LIN' can be transmitted by the first polarizing beam splitter 621 to the image forming device 230, and similarly, the second polarization rather than the first polarization of the scattered light beam 'LS' can be captured by the detector 250. Other details about the structure and the operation of the interactive projection device 1400 are similar to those described for the interactive projection device 200 of FIGS. 2A and 2B so are omitted for brevity.

Similarly, the interactive projection device 1400 can also be varied to have an invisible light emitting device oriented to the surface 22, an invisible light emitting device oriented to the first polarizing beam splitter 1421, and ambient light along with an object movable on the surface 22 to replace the role of the pointer 24 in FIG. 14, respectively.

Figure 15A:
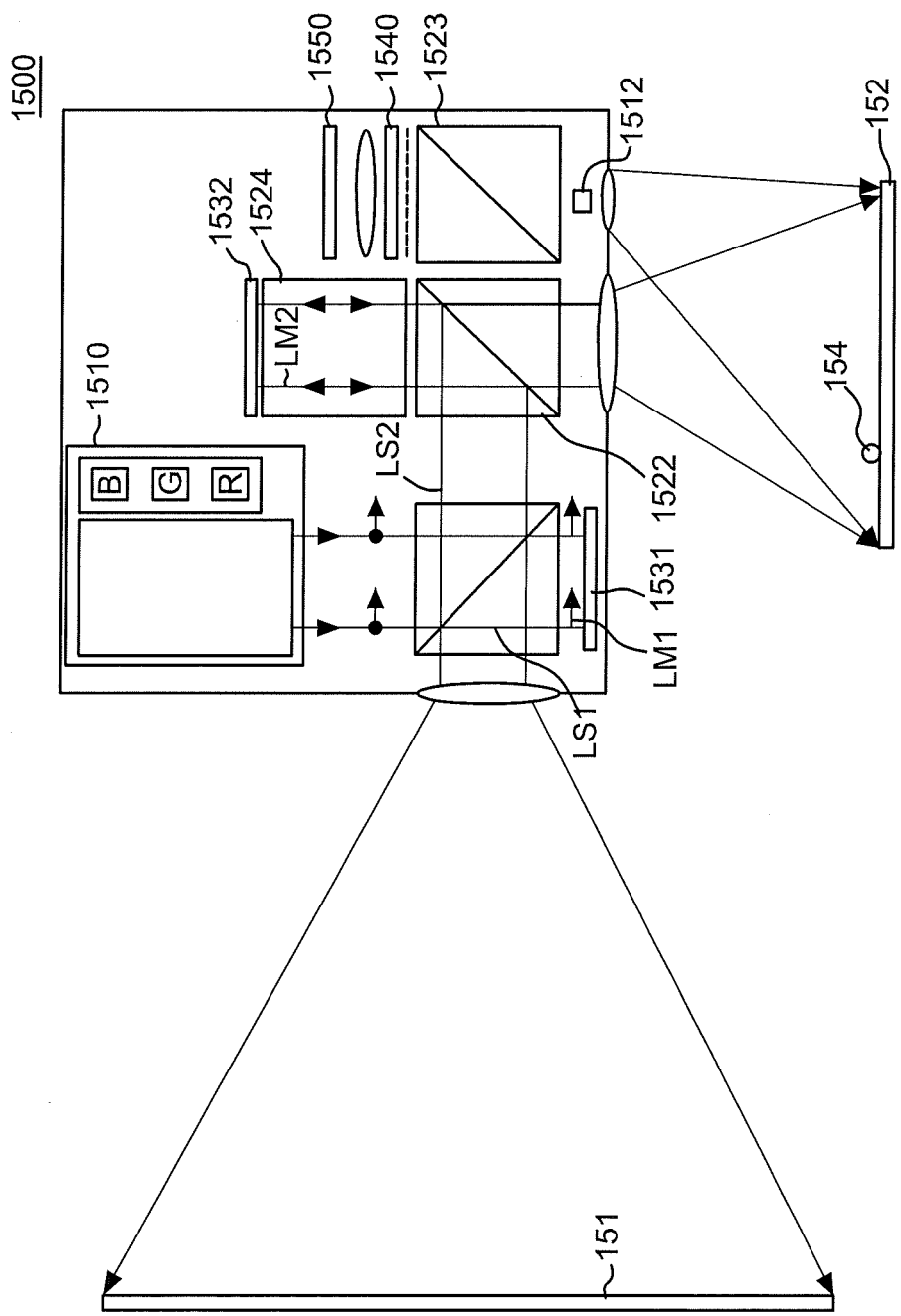
FIGS. 15-18C are schematic diagrams of interactive projection devices having two image forming devices, one detector, and multiple polarizing beam splitters in accordance with different embodiments.
Figure 15B:
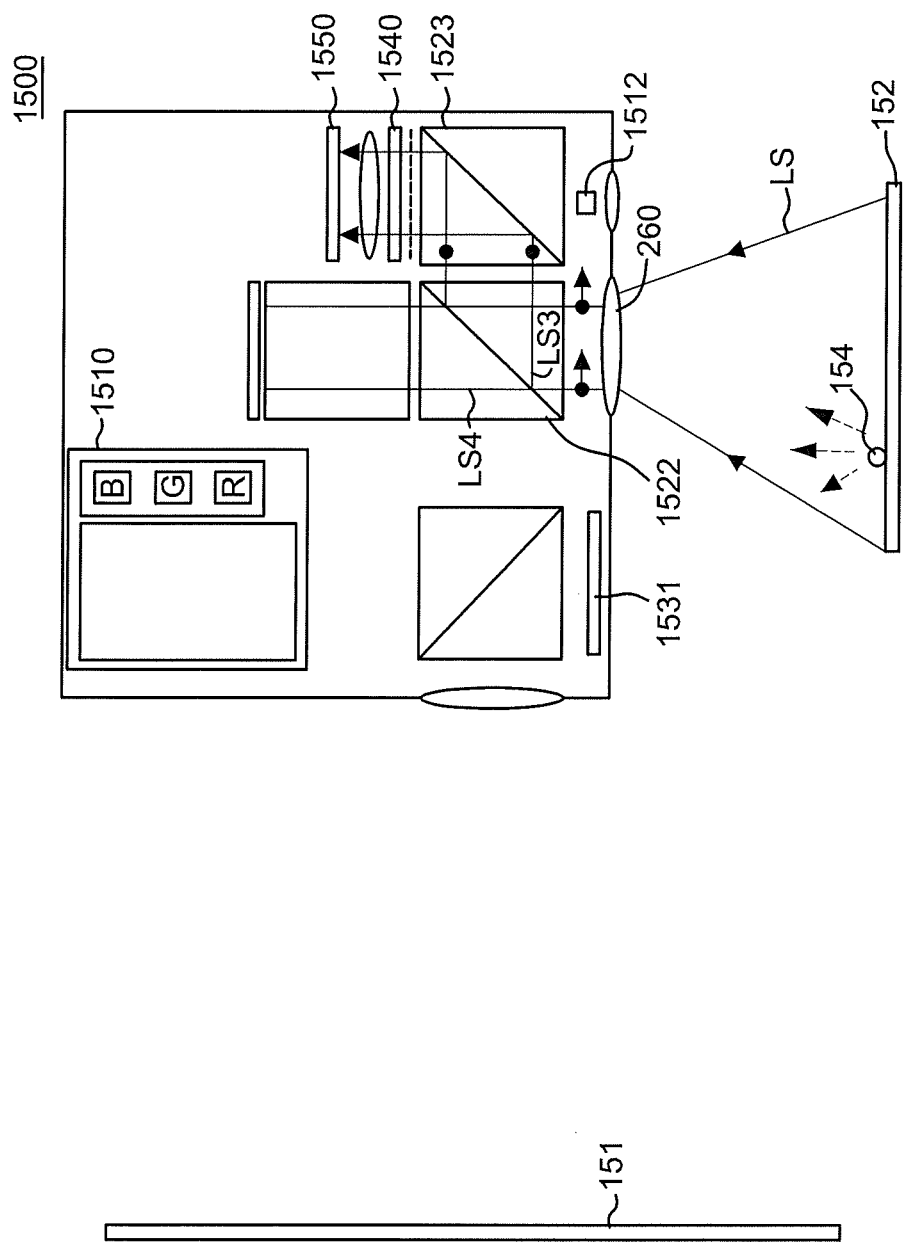

FIGS. 15A and 15B are schematic diagrams of an interactive projection device 1500 in accordance with another embodiment. The interactive projection device 1500 differs from the interactive projection device 600 of FIGS. 6A and 6B mainly in addition of another image forming device that can project another projection image onto a different surface. Specifically, the interactive projection device 1500 includes a light source 1510 with a visible light emitting device, a first polarizing beam splitter 1521, a second polarizing beam splitter 1522, a third polarizing beam splitter 1523, a cube 1524, a first image forming device 1531, a second image forming device 1532, a filter 1540, a detector 1550, and an invisible light emitting device 1512. The cube 1524 preferably has a refractive index the same as that of the first polarizing beam splitter 1521 so as to compensate optical path difference.

FIG. 15A illustrates first and second projection processes respectively for the first and second image forming devices 1531 and 1532. As shown, the light source 1510 can emit an input light beam 'LIN', which is then split by the first polarizing beam splitter 1521 into a first split light beam 'LS1' having a first polarization and a second split light beam 'LS2' having a second polarization. The first and second split light beams 'LS1' and 'LS2' are further directed to the first image forming device 1531 and the second polarizing beam splitter 1522, respectively.

The first image forming device 1531 can then produce a first image light beam 'LM1' based on the first split light beam 'LS1', and emit the first image light beam 'LM1' to the first polarizing beam splitter 1521, which can further reflect the second polarization component of the first image light beam 'LM1' onto a first surface 151, resulting in a first projection image thereon.

On the other hand, the second split light beam 'LS2' can be further split by the second polarizing beam splitter 1522, which can then direct the second component of the second split light beam 'LS2' through the cube 1524 to the second image forming device 1532.

Similarly, the second image forming device 1532 can then produce a second image light beam 'LM2' based on the second component of the second split light beam 'LS2'. The second image forming device 1532 can emit the second image light beam 'LM2' through the cube 1524 to the second polarizing beam splitter 1522, which can further transmit the first polarization component of the second image light beam 'LM2' onto a second surface 152, resulting in a second projection image thereon.

Referring to FIG. 15B that illustrates a capturing process, the second image light beam 'LM2' transmitted from the second polarizing beam splitter 1522 and the invisible light emitted by the invisible light emitting device 1512, after reaching the second surface 152, can be scattered by the second surface 152 and an object 154 thereon, forming a scatted light beam 'LS' that can be further received by the second polarizing beam splitter 1522.

The second polarizing beam splitter 1522 can then split the scattering light beam 'LS' into third and fourth split light beams 'LS3' and 'LS4' respectively having the second and first polarizations. The third split light beam 'LS3' can be directed through the third polarizing beam splitter 1523, filtered by the filter 1540 to remove the visible light in it, and finally captured by the detector 1550. As a result, the detector 1550 can acquire a scattering image and recognize the position of the object 154.

In practical applications, it is not necessary that both of the first and second image forming devices 1531 and 1532 are configured to project dynamic projection images. For example, the first image forming device 1531 can be configured to project a dynamic and bigger projection image on a wall serving as the first surface, while the second image forming device 1532 can be configured to project a static and smaller projection image on a screen severing as the second surface 152 at the near side of an user. The interactive projection device 1500 can satisfy various application requirements. For example, it can solve the inconvenience in some circumstances where a user has difficulty in moving fingers on the surface of the projection image. Other details about the structure and the operation of the interactive projection device 1500 are similar to those described for the interactive projection device 200 of FIGS. 2A and 2B so are omitted for brevity.

Figure 16:
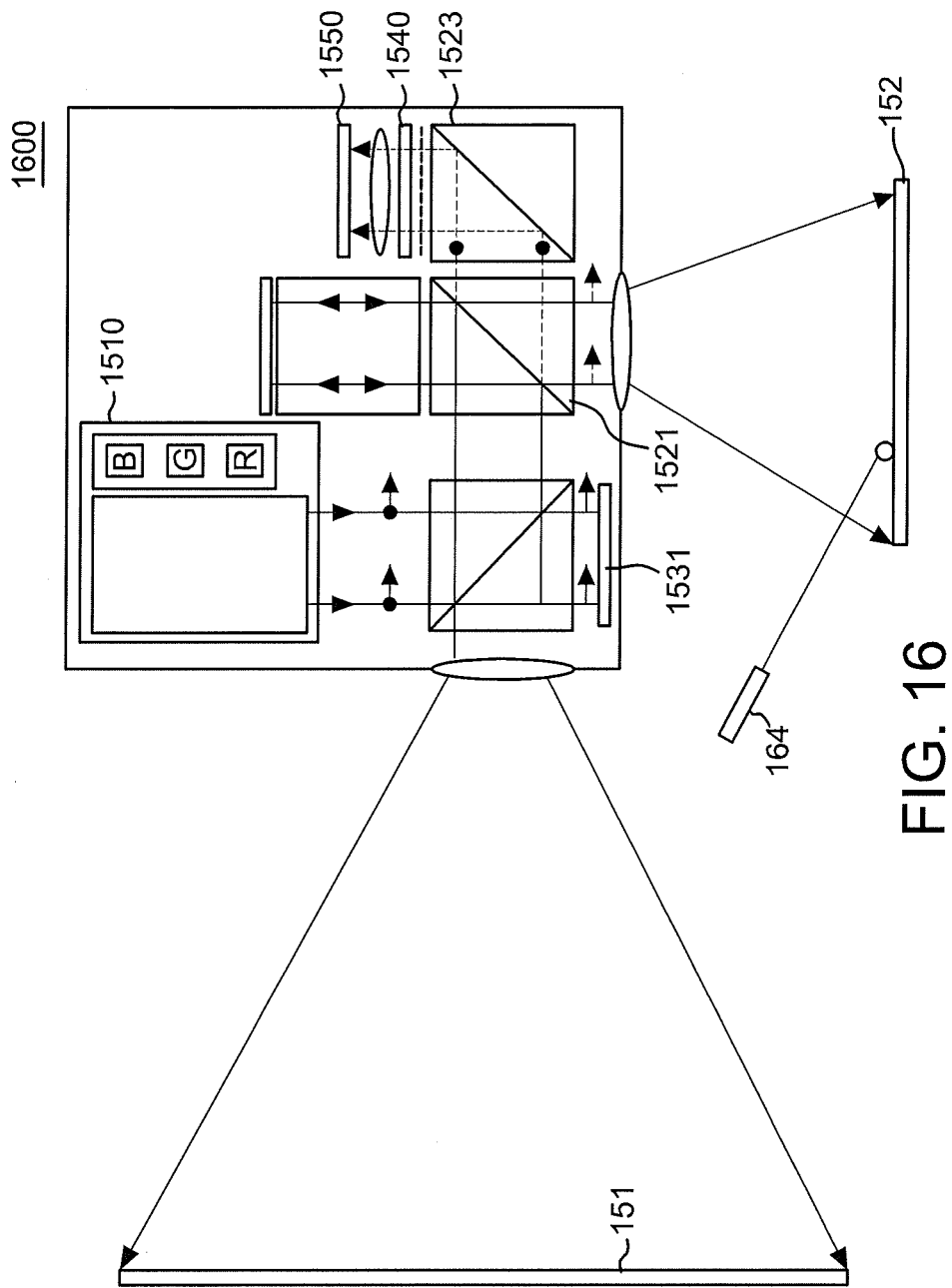
Figure 17:
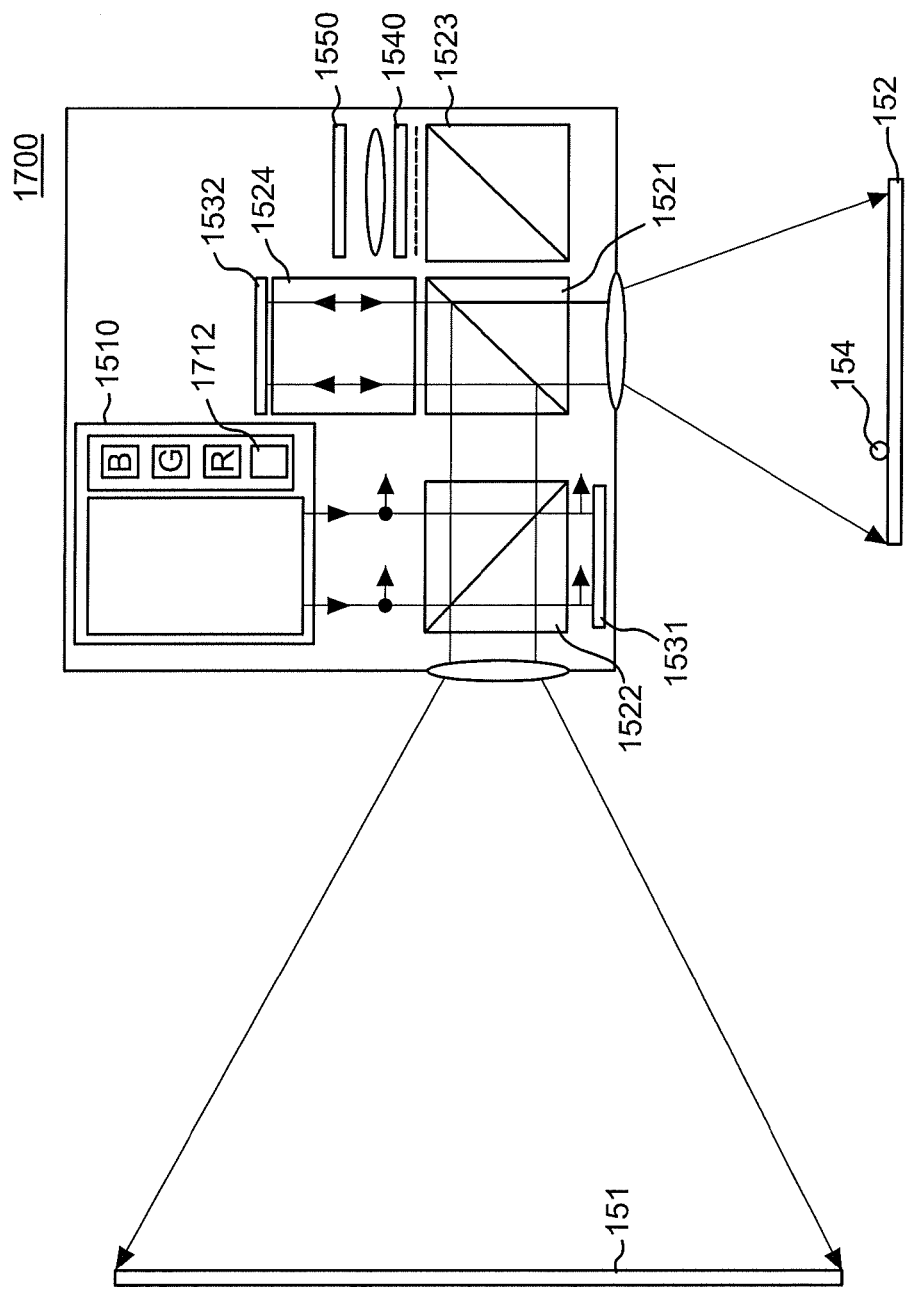

FIGS. 16 and 17 are schematic diagrams of interactive projection devices 1600 and 1700 in accordance with two embodiments varied from the interactive projection device 1500, respectively having a pointer 164 and an invisible light emitting device 1712 facing the first surface 152 that act as light sources for forming the scattering image. Additionally, it can be appreciated that ambient light can be also be utilized in circumstances with sufficient invisible ambient light. Additionally, in some alternative embodiments even without any invisible light source, the interactive projection device can also generate a detection signal after it recognizes a signal representing the invisible light transmitted to the detector. It should be also understood that the filter 1540 and the invisible light emitting device 1712 embedded in the interactive projection device are not must. Additionally, the detector 1550 can also detect the visible light instead of invisible light, or both of visible light and invisible light for the purpose of generating a reaction signal. In a case where visible light is detected by the detector 1550, the captured signal is compared to a signal representing the projection image received from the image forming device 1532. In an alternative embodiment, the light source 1510 can be turned off when the capturing process is proceeding. Other details about the structure and the operation of the interactive projection devices 1600 and 1700 are similar to those described for the interactive projection device 1500 of FIGS. 15A and 15B so are omitted for brevity.

Figure 18A:
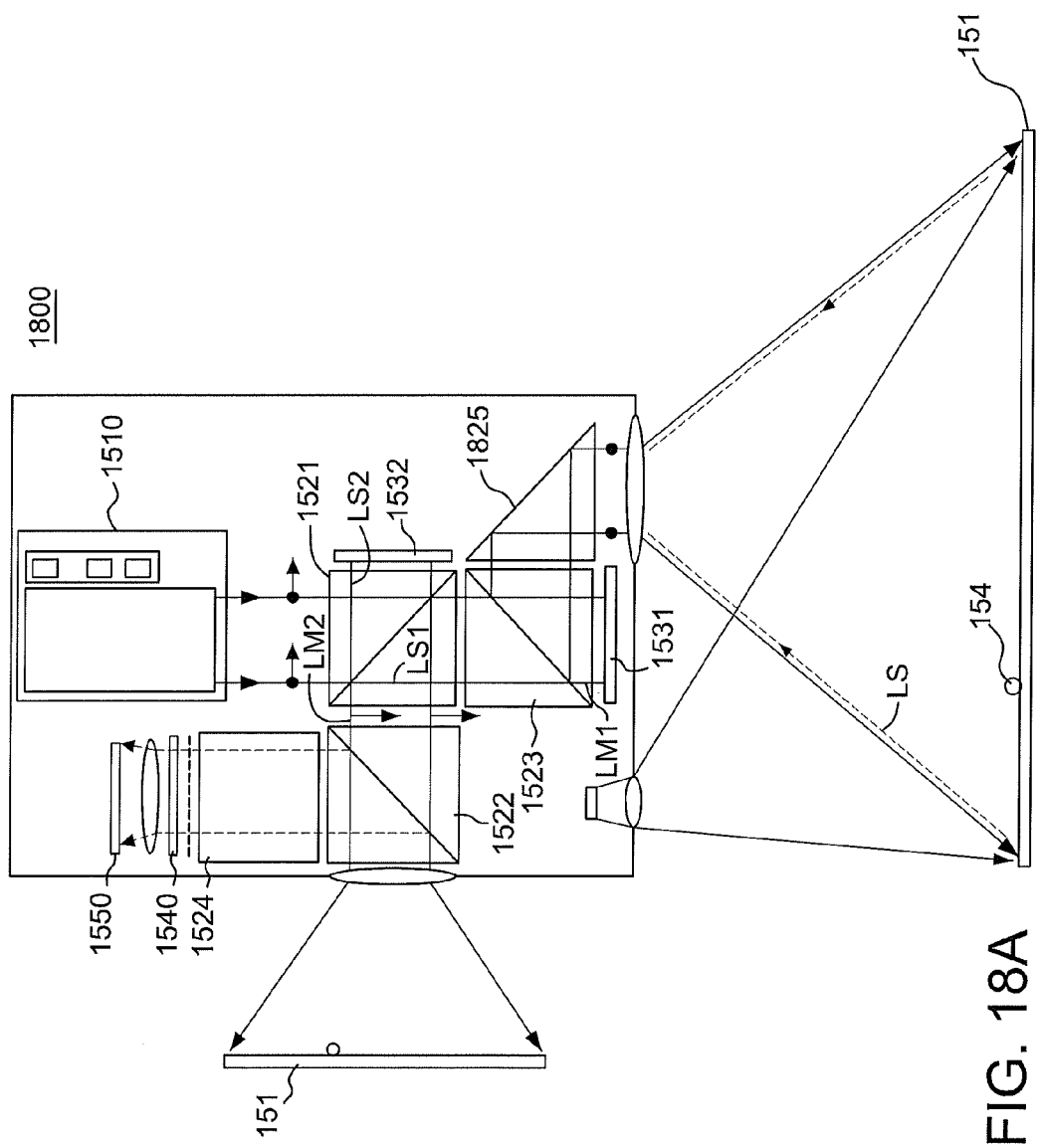

FIG. 18A is a schematic diagram of an interactive projection device 1800 in accordance with another embodiment. FIG. 18 differs from FIG. 15 mainly in relative positions between the components and the first and second surfaces, and addition of a reflector 1825. The reflector 1825 is configured to reflect a first image light beam 'LM1' that is generated by the first image foaming device 1531 and split by the third polarizing beam splitter 1523 to the first surface 151, resulting in the first projection image on the first surface 151. With this difference, the second polarization rather than the first polarization of the input light beam 'LM' can be transmitted to the first image forming device 1531.

Figures 18B, 18C:
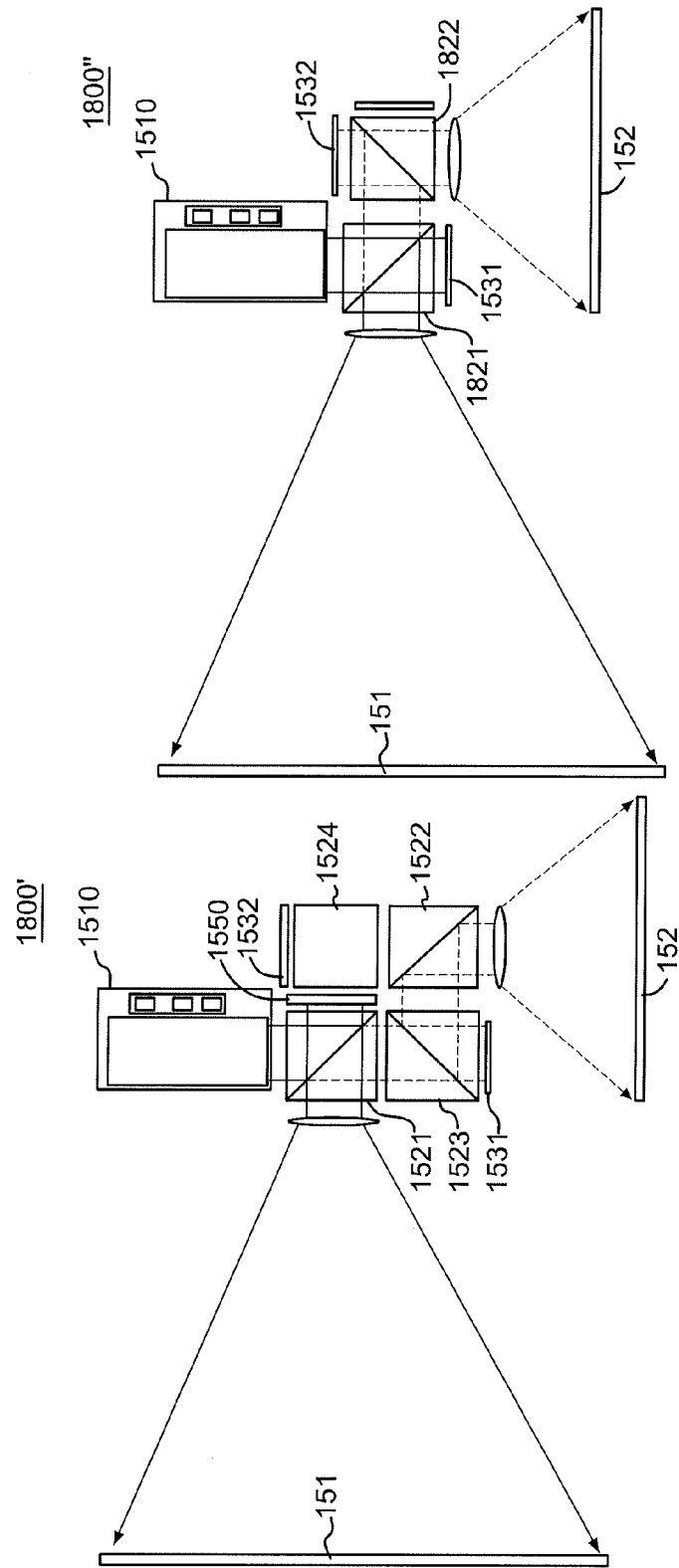

FIGS. 18B and 18C are schematic diagrams of two interactive projection devices 1800' and 1800" in accordance with another embodiment. FIG. 18B differs from FIG. 15 mainly in relative positions between the components. FIG. 18C differs from FIG. 15 mainly in having fewer polarizing beam splitters 1821 and 1822. Other details about the structure and the operation of the interactive projection devices 1800' and 1800" are similar to those described for the interactive projection device 1500 of FIGS. 15A and 15B so are omitted for brevity.

FIGS. 19A and 19B are schematic diagrams of an interactive projection device 1900 in accordance with another embodiment. The interactive projection device 1900 differs from the interactive projection device 1500 of FIG. 15 mainly in addition of another detector and another filter that are implemented to capturing another scattering image. Specifically, the interactive projection device 1900 additionally includes a second filter 1942, a second detector 1952, a second cube 1925, and a third cube 1926. Preferably, the first, second, third cubes 1924, 1925, and 1926 have refractive indexes the same as those of the first, second, and third polarizing beam splitters 1921, 1922, and 1923, respectively, so as to compensate optical path differences.

FIG. 19A illustrates first and second projection processes for first and second image forming devices 1931 and 1932. The first and second projection processes are similar to those for the first and second image forming devices 1531 and 1532 in FIG. 15A, differing mainly in that the first split light beam 'LS1' in FIG. 19A additionally pass through the second and third cubes 1925 and 1926 before it reaches a first image forming device 1931. The details are thus omitted for brevity.

FIG. 19B illustrates first and second capturing processes for the first and second detectors 1951 and 1952. The first capturing process for the first detector 1951 is similar to that for the detector 1550 in FIG. 15B. Briefly, in the first capturing process, the second polarizing beam splitter 1922 can split a first scattered light beam 'LSS1' received from the second surface 192 into fifth and sixth split light beams 'LS5' and 'LS6'. A first filter 1941 can filter out visible light of the fifth split light beam 'LS5'. The first detector 1951 can be configured to detect the invisible light of the fifth split light beam 'LS5' from the first filter 1941, thereby acquiring a first scattering image from a second surface 192.

Similarly, in the second capturing process, the first image light beam 'LM1' transmitted from the first polarizing beam splitter 1921 and the invisible light emitted by the pointer 194, after reaching the first surface 191, can be scattered by the first surface 191, forming a second scattered light beam 'LSS2'. The first polarizing beam splitter 1921 can then split the second scattering light beam 'LS2' into third and fourth split light beams 'LS3' and 'LS4' respectively having the first and second polarizations. The third split light beam 'LS3' can be directed through the second and third polarizing beam splitter 1922 and 1923, filtered by the second filter 1942 to remove visible light in it, and finally captured by the second detector 1952. As a result, the second detector 1952 can acquire a second scattering image and recognize the position of the target spot 'S' pointed by the pointer 194. Other details about the structure and the operation of the interactive projection device 1900 are similar to those described for the interactive projection device 200 of FIGS. 2A and 2B and the interactive projection device 1500 of FIGS. 15A and 15B so are omitted for brevity.

In the embodiment of FIGS. 19A and 19B, the pointer 194 and an invisible light emitting device 1912 along with an object movable on the second surface 192 are implemented as light sources for forming the second and first scattering images, respectively. However, various combinations of light sources can be implemented for forming the second and first scattering images in other embodiments.

Figure 21:
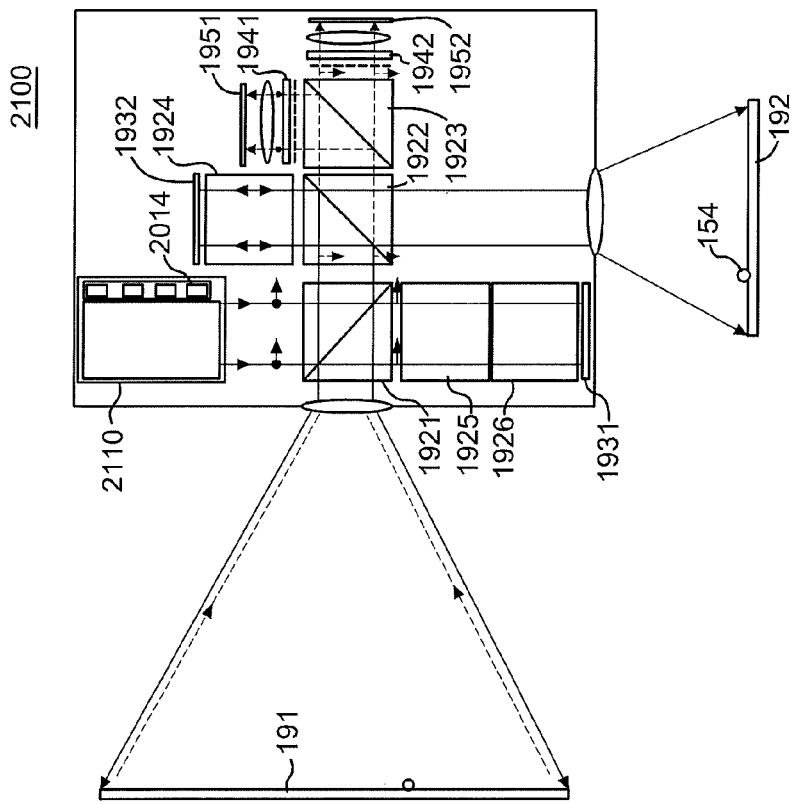
Figure 20:
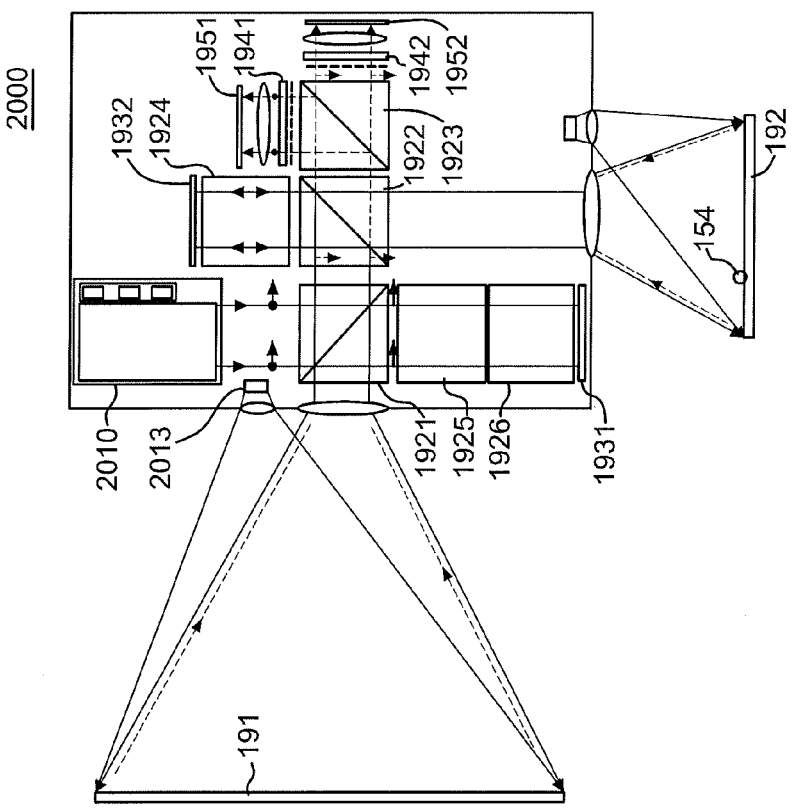
Figure 23:
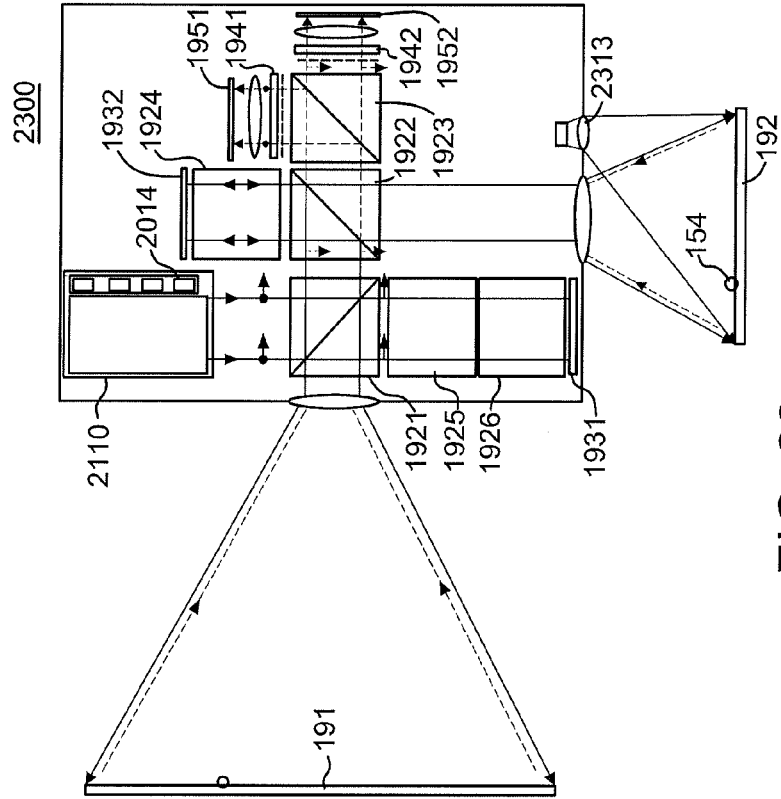

FIGS. 20 and 21 are schematic diagrams of interactive projection devices 2000 and 2100 in accordance with such two embodiments. In the interactive projection device 2000, an invisible light emitting device 2013 facing the first surface 191 takes the role of the pointer 194. In the interactive projection device 2100, an invisible light emitting device 2014 combined into (or alternatively separated from) the light source 2110 takes the roles of both the pointer 194 and the invisible light emitting device 1912 in FIG. 19.

Figure 22:
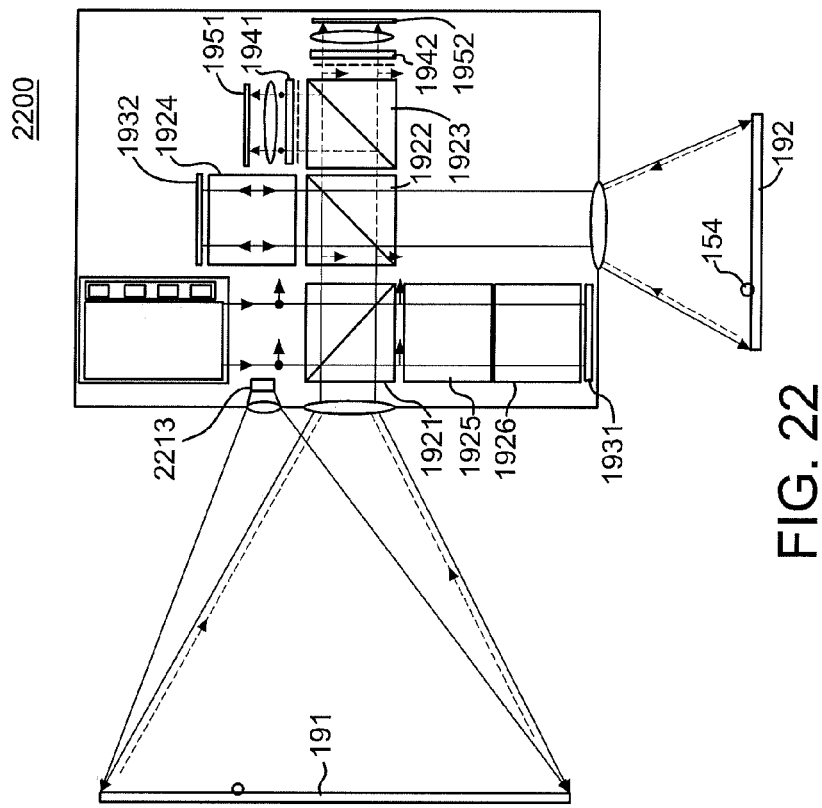

Additionally, it is also noted that an additional invisible light source can be further added to the interactive projection device 2100 so as to increase the brightness on the first or second surface 191 or 192. For example, an additional invisible light source 2213 is added to interactive projection device 2200 in FIG. 22 so as to increase the brightness on the first surface 191. On the other hand, an additional invisible light source 2313 is added to interactive projection device 2300 so as to increase the brightness on the second surface 192.

While certain embodiments have been described above, it will be understood that the embodiments described are by way of examples only. Accordingly, the device and methods described herein should not be limited to the described embodiments. Rather, the device and methods described herein should only be limited in light of the claims that follow when taken in conjunction with the above description and accompanying drawings.

What is claimed is:

1. An interactive projection device, comprising:
a light source configured to emit an input light beam, wherein the light source comprises a visible light emitting device;
a first beam splitter configured to split the input light beam into first and second split light beams;
a second beam splitter configured to split a scattered light beam received from a surface into third and fourth split light beams;
an image forming device configured to produce an image light beam based on the first split light beam and emit the image light beam onto the surface through the first and second splitters, thereby generating a projection image on the surface;

a cube configured to transmit the third split light beam from the second beam splitter and operable for compensating the optical path difference between the image light beam and the third light split beam; and a detector configured to detect the light of the third split light beam transmitted through the cube, thereby acquiring a scattering image from the surface.

2. The interactive projection device of claim 1, further comprising a filter configured to filter out visible light from the third split light beam.

3. The interactive projection device of claim 1, wherein the cube has the same refraction index as that of the first beam splitter.

4. The interactive projection device of claim 1, further comprising:

a first lens device disposed between the second beam splitter and the scattering surface, configured to guide the image light beam to the surface; and a second lens device disposed between the second beam splitter and the detector, configured to guide the third split light beam to the detector.

5. The interactive projection device of claim 1, wherein the image forming device is a reflective imaging forming device selected from a group comprising a liquid crystal on silicon (LCOS) device and a reflective liquid crystal display (LCD) device.

6. The interactive projection device of claim 1, wherein the beam splitter is a polarizing beam splitter.

7. The interactive projection device of claim 1, wherein the scattered light beam includes at least one of light from a pointer configured to emit at least one of invisible light and visible light in accordance with user control, and ambient invisible light scattered by an object to be detected.

8. The interactive projection device of claim 1, further comprising an invisible light emitting device selected from a group comprising an infrared light emitting device and an ultraviolet light emitting device, wherein the invisible light source is combined into or separated from the light source, configured to emit invisible light to at least one of the beam splitters and the surface.

9. The interactive projection device of claim 3, wherein the first beam splitter is disposed between the light source and the image forming device, the second beam splitter is disposed facing the first beam splitter at one side and between the surface and the cube, and the cube is disposed between the second beam splitter and the filter.

10. The interactive projection device of claim 3, wherein the first beam splitter is disposed facing the light source at a first side and facing the image forming device at a second side adjacent to the first side, the second beam splitter is disposed between the first beam splitter and the surface, and the cube is disposed between the second beam splitter and the filter.

11. The interactive projection device of claim 1, further comprising a processor configured to generate a reaction control signal in accordance with detection signals generated by the detector.

12. The interactive projection device of claim 11, wherein the detection signal is generated by the detector after comparing a signal representing the visible light of the third split light beam and a signal representing the projection image.

13. The interactive projection device of claim 12, wherein the scattered light beam includes at least one of light from a pointer configured to emit at least one of invisible light and visible light in accordance with user control, and ambient invisible light scattered by an object to be detected.

14. The interactive projection device of claim 12, further comprising an invisible light emitting device selected from a group comprising an infrared light emitting device and an ultraviolet light emitting device, wherein the invisible light source is combined into or separated from the light source, configured to emit invisible light to at least one of the first beam splitter and the second surface.

15. The interactive projection device of claim 12, further comprising a processor configured to generate a reaction control signal in accordance with a detection signal generated by the detector.

16. The interactive projection device of claim 15, wherein the detection signal is generated by the detector after comparing a signal representing the visible light of the third split light beam and a signal representing the projection image.

17. An interactive projection device, comprising:

a light source configured to emit an input light beam, wherein the light source comprises a visible light emitting device;

a first beam splitter configured to split the input light beam into first and second split light beams;

a first image forming device configured to produce a first image light beam based on the first split light beam and emit the first image light beam onto a first surface, thereby generating a first projection image on the first surface;

a second beam splitter configured to split a first scattered light beam received from a second surface into third and fourth split light beams;

a second image forming device configured to produce a second image light beam based on the second split light beam and emit the second image light beam onto the second surface, thereby generating a second projection image on the second surface;

a detector configured to detect the light of the third split light beam, thereby acquiring a scattering image from the second surface;

a third beam splitter, disposed between the second image forming device and the first beam splitter and facing the second beam splitter at one side; and a cube, disposed between the detector and the second beam splitter and facing the detector at one side, wherein the cube has the same refraction index as that of the first beam splitter, and wherein the first beam splitter is disposed between the light source and the third beam splitter and between the first surface and the first image forming device, and the second beam splitter is disposed between the second surface and the cube and facing the third beam splitter at one side.

18. The interactive projection device of claim 17, further comprising a filter configured to filter out visible light from the third split light beam.

19. The interactive projection device of claim 17, further comprising:

a third beam splitter disposed facing the second beam splitter at one side and facing the detector at another side; and a cube disposed between the second beam splitter and the second image forming device, wherein the cube has the same refraction index as that of the first beam splitter, and wherein the first beam splitter is disposed between the light source and the first image forming device and between the first surface and the second beam splitter, and the second beam splitter is disposed between the first beam splitter and the third beam splitter and between the second surface and the cube.

20. The interactive projection device of claim 17, further comprising:
    a third beam splitter, disposed between the first beam splitter and the first image forming device;
    a reflector, disposed facing the third beam splitter at one side and facing the first surface at another side; and
    a cube, disposed between the detector and the second beam splitter, wherein the cube has the same refraction index as that of the first beam splitter, and wherein the first beam splitter is disposed between the light source and the third beam splitter and between the second image forming device and the second beam splitter, and the second beam splitter is disposed between the second surface and the first beam splitter and facing the cube at one side.

21. The interactive projection device of claim 17, wherein each of the first and second image forming devices is a reflective imaging forming device selected from a group comprising a liquid crystal on silicon (LCOS) device and a reflective liquid crystal display (LCD) device.

22. The interactive projection device of claim 17, wherein the beam splitter is a polarizing beam splitter.

23. An interactive projection device, comprising:
    a light source configured to emit an input light beam, wherein the light source comprises a visible light emitting device;
    a first beam splitter configured to split the input light beam into first and second split light beams and split a first scattered light beam received from a first surface into third and fourth split light beams;
    a first image forming device configured to produce a first image light beam based on the first split light beam and emit the first image light beam onto the first surface, thereby generating a first projection image on the first surface;
    a second beam splitter configured to split a second scattered light beam received from a second surface into fifth and sixth split light beams;
    a second image forming device configured to produce a second image light beam based on the second split light beam and emit the second image light beam onto the second surface, thereby generating a second projection image on the second surface;
    a first detector configured to detect the invisible light of the fifth split light beam, thereby acquiring a first scattering image from the second surface; and
    a second detector configured to detect the light of the third split light beam, thereby acquiring a second scattering image from the first surface.

24. The interactive projection device of claim 23, further comprising:
    a first filter configured to filter out visible light from the fifth split light beam; and
    a second filter configured to filter out visible light from the third split light beam.

25. The interactive projection device of claim 23, further comprising:
    a third beam splitter, disposed between the second beam splitter and the second filter and facing the first filter at one side;
    a first cube, disposed between the second image forming device and the second surface;
    a second cube and a third cube, disposed between the first beam splitter and the first image forming device, wherein the first and third cube have the same refraction indexes as that of the third beam splitter, and the second cube has the same refractive index as the second beam splitter, and wherein the first beam splitter is disposed between the light source and the second cube and between the first surface and the second beam splitter, and the second beam splitter is disposed between the second surface and the first cube and between the first beam splitter and third beam splitter.

26. The interactive projection device of claim 23, wherein each of the first and second image forming devices is a reflective imaging forming device selected from a group comprising a liquid crystal on silicon (LCOS) device and a reflective liquid crystal display (LCD) device.

27. The interactive projection device of claim 23, wherein the beam splitter is a polarizing beam splitter.

28. The interactive projection device of claim 23, wherein each of the first and second scattered light beams includes at least one of light from a pointer configured to emit at least one of invisible light and visible light in accordance with user control, and ambient invisible light scattered by an object to be detected.

29. The interactive projection device of claim 23, further comprising at least one invisible light emitting device selected from a group comprising an infrared light emitting device and an ultraviolet light emitting device, wherein the at least one invisible light source is combined into or separated from the light source, configured to emit invisible light to at least one of the first beam splitter, the first surface, and the second surface.

30. The interactive projection device of claim 23, further comprising a processor configured to generate a reaction control signal in accordance with a detection signal generated by the first and second detectors.

31. The interactive projection device of claim 30, wherein the detection signal is generated by the detector after comparing a signal representing the visible light of the third split light beam and a signal representing the projection image.

* * * * *